United States Patent
Gali et al.

(10) Patent No.: US 11,750,464 B2
(45) Date of Patent: Sep. 5, 2023

(54) GLOBAL NETWORK STATE MANAGEMENT

(71) Applicant: Juniper Networks, Inc., Sunnyvale, CA (US)

(72) Inventors: Shivaprasad Gali, Bangalore (IN); Sri Sampath Mallipudi, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 73 days.

(21) Appl. No.: 17/249,612

(22) Filed: Mar. 6, 2021

(65) Prior Publication Data
US 2022/0286360 A1 Sep. 8, 2022

(51) Int. Cl.
*G06F 15/16* (2006.01)
*H04L 41/12* (2022.01)
(Continued)

(52) U.S. Cl.
CPC .......... *H04L 41/12* (2013.01); *H04L 12/2876* (2013.01); *H04L 41/082* (2013.01); *H04L 41/0886* (2013.01); *H04L 41/0893* (2013.01)

(58) Field of Classification Search
CPC . H04L 41/12; H04L 41/0895; H04L 41/0816; H04L 41/122; H04L 41/40;
(Continued)

(56) References Cited

U.S. PATENT DOCUMENTS 7,062,550 B1   6/2006  Hutchinson et al.
7,729,290 B2   6/2010  Saleh et al.
(Continued)

FOREIGN PATENT DOCUMENTS

EP   2204056 B1   7/2010
EP   2486697 B1   12/2013
EP   3672157 A1   6/2020

OTHER PUBLICATIONS

"3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, Jun. 2010, 261 pp.
U.S. Appl. No. 13/724,975, filed Dec. 21, 2012, entitled "Software-Defined Mobile Core".
"Hot Rod Java Client Guide," https://infinispan.org/docs/dev/titles/hotrod_java/hotrod_java.html, last updated Dec. 22, 2020, 40 pp.
(Continued)

*Primary Examiner* — Dustin Nguyen
*Assistant Examiner* — Hao H Nguyen
(74) *Attorney, Agent, or Firm* — Shumaker & Sieffert, P.A.

(57) ABSTRACT

Devices, systems, and techniques for global network state management are described herein. In one example, the present disclosure describes an example method performed by a software-defined network (SDN) controller that manages a network of a plurality of devices. The method include maintaining, by processing circuitry of the SDN controller, global network state information, configuring, by the processing circuitry, a notification service with a subscription for updates to a portion of the global network state information, wherein the notification service is configured to arrange the updates to the portion of the global network state information into a plurality of events, and distributing, by the notification service and via a plurality of interfaces, the plurality of events as event notifications to a plurality of subscriber micro-services of the SDN controller.

19 Claims, 9 Drawing Sheets

(51) Int. Cl.
  *H04L 12/28* (2006.01)
  *H04L 41/082* (2022.01)
  *H04L 41/08* (2022.01)
  *H04L 41/0893* (2022.01)

(58) Field of Classification Search
  CPC ... H04L 45/02; H04L 41/082; H04L 41/0893; H04L 41/0886; H04L 12/2876; H04L 43/20
  See application file for complete search history.

(56) References Cited

U.S. PATENT DOCUMENTS

| | | | |
|---|---|---|---|
| 8,693,374 | B1 | 4/2014 | Murphy et al. |
| 8,711,704 | B2 | 4/2014 | Werb et al. |
| 8,775,591 | B2 | 7/2014 | Bobak et al. |
| 8,861,527 | B1* | 10/2014 | Bao .................. H04L 12/4633 370/392 |
| 9,070,268 | B2 | 6/2015 | Monacos et al. |
| 9,450,817 | B1* | 9/2016 | Bahadur ............ H04L 41/0806 |
| 9,461,877 | B1 | 10/2016 | Nadeau et al. |
| 9,736,185 | B1* | 8/2017 | Belamaric ............... H04L 63/20 |
| 10,027,728 | B2 | 7/2018 | Yang et al. |
| 10,142,444 | B2 | 11/2018 | Reynolds et al. |
| 10,193,706 | B2 | 1/2019 | Bhattacharya et al. |
| 10,365,915 | B2 | 7/2019 | Vora et al. |
| 10,447,538 | B2 | 10/2019 | Maes |
| 10,708,126 | B2 | 7/2020 | Singla et al. |
| 10,740,196 | B2 | 8/2020 | Park et al. |
| 2003/0149756 | A1* | 8/2003 | Grieve ................ H04L 41/0866 709/223 |
| 2003/0149761 | A1 | 8/2003 | Baldwin et al. |
| 2003/0208572 | A1 | 11/2003 | Shah et al. |
| 2016/0335293 | A1* | 11/2016 | Teodorescu ........... G06F 40/174 |
| 2016/0380807 | A1* | 12/2016 | Shevenell ............ H04L 41/082 370/254 |
| 2017/0085438 | A1 | 3/2017 | Link et al. |
| 2017/0250869 | A1 | 8/2017 | Voellmy |
| 2018/0006935 | A1* | 1/2018 | Mutnuru ............ H04L 67/1001 |
| 2018/0048525 | A1* | 2/2018 | Karasaridis ............ H04L 69/40 |
| 2018/0069793 | A1* | 3/2018 | Narayanan ........... H04L 47/215 |
| 2018/0152525 | A1* | 5/2018 | Kapoor .................. H04L 67/10 |
| 2020/0186613 | A1* | 6/2020 | Johns ..................... H04L 67/10 |
| 2020/0401462 | A1* | 12/2020 | Viggers ................... G06F 9/546 |
| 2022/0237203 | A1* | 7/2022 | Das ......................... G06F 16/27 |

OTHER PUBLICATIONS

Nejkovic V. et al. (2019) Big Data in 5G Distributed Applications. In: Kolodziej J., González-Vélez H. (eds) High-Performance Modelling and Simulation for Big Data Applications. Lecture Notes in Computer Science, vol. 11400. Springer, Cham. https://doi.org/10.1007/978-3-030-16272-6_5, 25 pp.

"Deliverable D5.6 Final platform prototype for 5G PaaS," Project Name: Next Generation Platform as a Service, NGPaaS, Deliverable D5.6, Jun. 30, 2019, 47 pp.

"View on 5G Architecture," Version 3.0, 5G PPP Architecture Working Group, Jun. 19, 2019, 166 pp.

"Ultra Cloud Core 5G Session Management Function, Release Feb. 2020—Configuration and Administration Guide," Disco Systems, Inc., First Published: Apr. 30, 2020, Last Modified: Jul. 10, 2020, 738 pp.

"AI in Network Use Cases in China," GSMA, Release Notes, Oct. 2019, 93 pp.

Gu, "Cloud data centers in the 5G era," Huawei Publications, Jun. 6, 2018, 8 pp.

Paolini, "The Power of Location in Networks Without Borders," NETSCOUT, https://www.netscout.com/blog/power-location-networks-without-borders, May 22, 2019, 6 pp.

Voulkidis et al., "5G PPP Research and Validation of critical technologies and systems: Enabling Smart Energy as a Service via 5G Mobile Network advances," Deliverable 2.3, 5G trusted, Project: H2020-ICT-07-2017, Mar. 31, 2019, 133 pp.

"Redis Cluster Specification," Redis, https://redis.io/topics/cluster-spec, first accessed Dec. 2, 2020, 35 pp.

Hamel et al., "5G System," Cisco Proposal, TECSPM-2306, Cisco Live, Jan. 27-31, 2020, 244 pp.

"5G Network Architecture—A High Level View," Huawei Technologies Co., LTD., Jul. 22, 2016, 21 pp.

"5G and EMF Explained," EMF Explained Series, Australian Mobile Telecommunications Association (AMTA), Aug. 23, 2019, 12 pp.

"Redis Keyspace Notifications," Redis, https://redis.io/topics/notifications, first accessed Dec. 2, 2020, 6 pp.

Extended Search Report from counterpart European Application No. 21176717.3 dated Oct. 28, 2021, 11 pp.

Response to Extended Search Report dated Oct. 28, 2021, from counterpart European Application No. 21176717.3 filed Mar. 6, 2023, 24 pp.

* cited by examiner

GLOBAL NETWORK STATE MANAGEMENT

TECHNICAL FIELD

The disclosure relates to networking systems.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other network devices.

At a network device, an operating system implements a number of components/features that configure hardware/software resources within the network device to operate as a router, a switch, a gateway, or the like. The operating system configures hardware components for routing and forwarding of the packets, for example, by invoking a number of routing protocols. There are instances when the network device must rely upon the operating system to configure the network device for the routing and forwarding of the packets.

SUMMARY

In general, the disclosure describes techniques that enable network state management. By doing so, these techniques regulate network state changes (e.g., a rate at which the network state changes are processed) to improve upon (e.g., optimize) a number of performance metrics. The network state changes described herein may refer to updates to device profile information and/or network topology information. Updating a network includes its devices to a current state may be computationally expensive and resource intense. In any network, devices operate properly when a current or recent network topology (or at least a portion thereof) is resolved and dataset(s) having descriptive information is/are available. Networks often rely on accessible state information for users/hosts running on certain devices including one or more devices in the same network or entities in other networks. Some networks maintain the above state information (e.g., as device profiles) in a centralized or distributed system for state information and the network controller ensures that these profiles are up-to-date. Ensuring proper operation involves the network controller propagating those updates within a small time window.

Techniques of the present disclosure leverage the network's resources to ensure proper operation by network devices and make efficient use of the available resources, for example, by leveraging a publisher-subscriber model to reduce latencies in identifying network state updates and then, propagating those updates to subscribers. Even for small networks but especially for larger ones, propagating these updates is resource-intensive, and the publisher-subscriber model reduces resource requirements of other controller modules/applications. The techniques enable the controller to handle incoming communications from a considerable number of sources of network state information, identify the network state updates, and utilize the publisher-subscriber model for propagating those updates to client micro-services without incurring errors in any operation.

Networks generally and service provider networks typically have a considerable number of computing services including micro-services, and the network controller of the present disclosure provides these micro-services with up-to-date state information. The techniques described herein benefit components of the network controller as well. As described herein, the controller may deploy various modules as micro-services in support of network services. By configuring one or more micro-services as publishers of network state updates and one or more other micro-services as subscribers of such updates, the controller may configure a notifications service to distribute event notifications. Event notifications may be messages informing subscriber micro-services of updates to datasets of interest. The publisher micro-service may configure the notifications service to map certain datasets to certain events, and if any client module/application in the network controller is to run a micro-service that requires up-to-date information from these datasets, the notifications service is configured to send event notifications that may include new information or include a mechanism for accessing new information. The controller may configure the publisher micro-service or another micro-service to implement a (e.g., configurable) sleep period (e.g., for a specific subscriber micro-service) while having a process/thread track notifications of add/remove/update events (e.g., by incrementing an event counter) and when the sleep period elapses, have a second process/thread start processing those notifications for current topology changes. Depending on the subscription, the controller may configure the second process/thread to pause or continue listening for future event notifications when the configurable time period elapses. Enforcing the sleep period on the first or second process/thread provides the controller with overload protection for event notification floods, avoids device profile mismatch and data inconsistency, and further provides user flexibility to configure a time window for the sleep period (e.g., a system_scheduler_device-profile-update-interval) on demand (e.g., at runtime).

In one example, a method is performed by a software-defined network (SDN) controller that manages a network of a plurality of devices. The method includes maintaining, by processing circuitry of the SDN controller, global network state information, wherein the global network state information comprises device profile information or network topology information corresponding to each of the devices in the network; configuring, by the processing circuitry, a notification service with a subscription for updates to a portion of the global network state information, wherein the notification service is configured to arrange the updates to the portion of the global network state information into a plurality of events; and distributing, by the notification service and via a plurality of interfaces, the plurality of events as event notifications to a plurality of subscriber micro-services of the SDN controller, wherein a first thread is configured to wait for a configurable time period while a second thread receives one or more event notifications from the notification service, and when the configurable time period elapses, the first thread reads at least one update to the portion of the global network state information in the one or more received event notifications.

In another example, a software-defined network (SDN) controller is to manage a network of one or more network devices. The SDN controller includes memory configured to store global network state information for the network devices, wherein the global network state information comprises device profile information and network topology information corresponding to each of the network devices; one or more processors configured to execute logic for a publisher micro-service, wherein the logic is operative to: maintain, in a database, global network state information, wherein the global network state information comprises device profile information or network topology information corresponding to each of the devices in the network; configure a notification service with a subscription for updates to a portion of the global network state information, wherein the notification service is configured to arrange the updates to the portion of the global network state information into a plurality of events; and distribute, via a plurality of interfaces, the plurality of events as event notifications to a plurality of subscriber micro-services of the SDN controller, wherein a first thread is configured to wait for a configurable time period while a second thread receives one or more event notifications from the notification service, and when the configurable time period elapses, the first thread reads at least one update to the portion of the global network state information in the one or more received event notifications; and one or more core modules or one or more core applications operating as one or more of the plurality of subscriber micro-services and configured to receive, via the first thread or the second thread, at least a portion of the event notifications corresponding to the subscription.

In another example, a computer-readable storage medium comprising processor-executable instructions that when executed in a software-defined network (SDN) controller that manages a network of one or more network devices, causes the SDN controller to: for each iteration of a sleep timer of a first thread: during a configurable time period, receive, by a second thread, event notifications from a notifications service configured to maintain global network state information in one or more databases, wherein the global network state information comprises device profile information or network topology information corresponding to each of the network devices in the network, wherein the event notifications comprises updates to the global network state information; when the configurable time period elapses, read, by the first thread, at least a portion of new network topology information or new device profile information from the one or more databases based on at least a portion of the updates to the global state information; and compute, by one or more modules, a network configuration comprising a network topology and device profiles based on the at least a portion of new network topology information or new device profile information; and implement, by the one or more modules or one or more applications, the network configuration, by programming, via a plurality of network device protocol interfaces, the plurality of network devices with the new network topology information and new device profile information.

The details of one or more examples are set forth in the accompanying drawings and the description below. Other features, objects, and advantages will be apparent from the description and drawings, and from the claims.

DETAILED DESCRIPTION

The present disclosure describes devices, techniques, and systems for network state management, and, in a number of examples, these devices, techniques, and systems maintain up-to-date network state information and, if needed, distribute the updates without significant delay. These examples demonstrate that the devices, techniques, and systems are capable of processing a substantial number of updates within a short amount of time, including handling (redundant) updates that are often sent by several sources.

FIGS. 1-7 and their respective descriptions herein introduce a network and a network controller for a service provider as described herein and the network controller of the present disclosure provides the above capabilities and provides other benefits to the network and the network's users and service provider subscribers. Moreover, the network controller receives streams of updates (continuously) within a short time period without being overwhelmed or having the updates interfere with important network management tasks. Some techniques employ batch processing to control a number (e.g., a maximum number) of updates being handled at one moment in time, allowing the network controller to conserve resources for performing other tasks while keeping the network topology state updated.

Networks generally provide a controller that includes a number of hardware and/or software components that when executed by processing circuitry and an operating system, run micro-services and services (e.g., application services) that use network state updates to support some functionality or operation, such as network functions in a network service (e.g., Internet or VPN) or an application service for a cloud service provider. As described herein, another micro-service, a publisher micro-service, configures a notifications service to run in the network and to publish these updates as events (e.g., keyspace events) where each event is a reference to datasets of (global) network state information. Receiving an event may prompt a subscriber micro-service to request new information from these datasets. Each event defines attribute data corresponding to (e.g., linking/mapping to) the above datasets (e.g., in a database).

Figure 1:
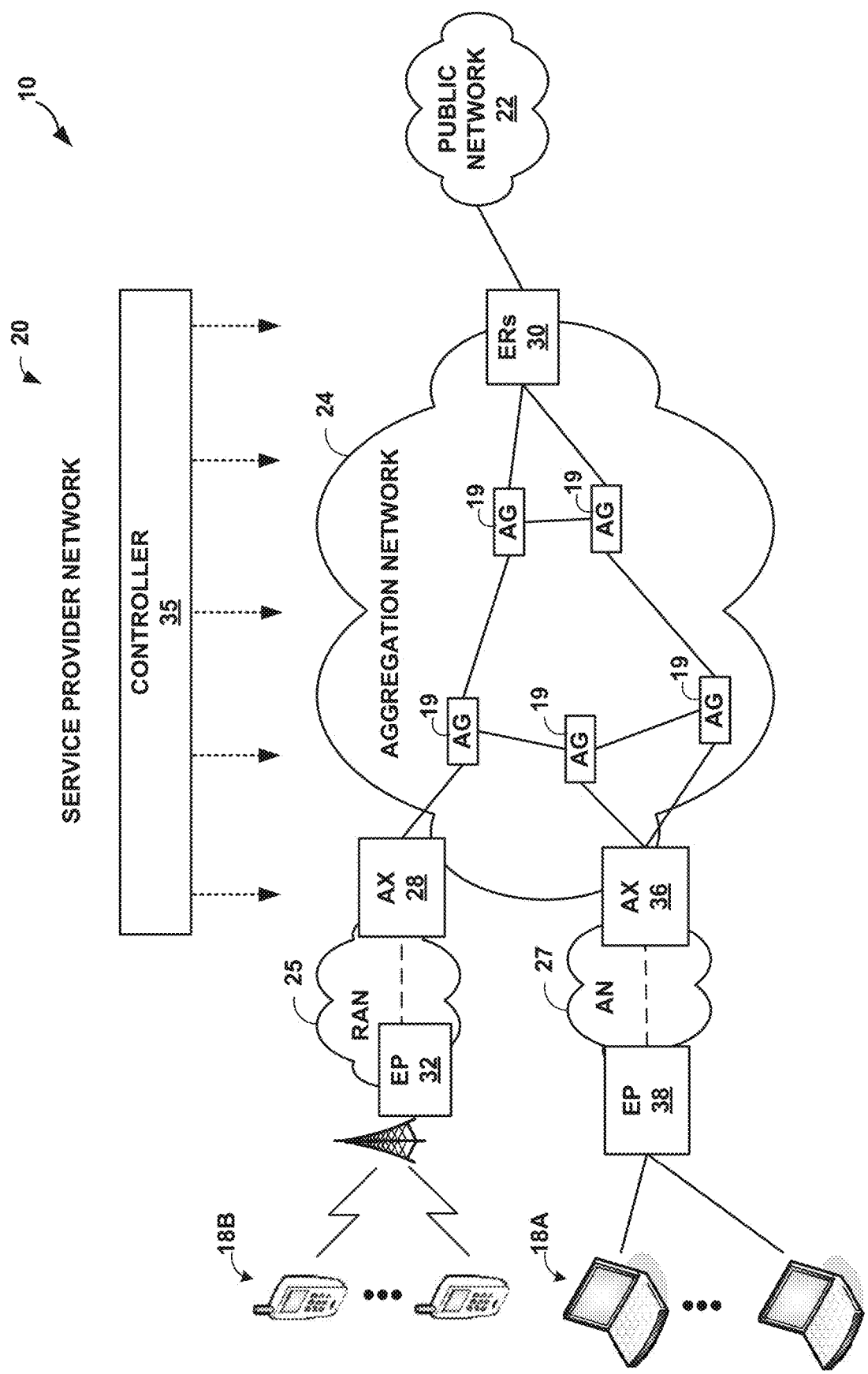
FIG. 1 is a block diagram illustrating an example network that operates in accordance with various aspects of the techniques described in this disclosure.

FIG. 1 illustrates controller 35 to represent any network controller that includes a number of hardware and software components of which one or more may constitute a module (e.g., a kernel-mode module) or an application (e.g., a user-mode application) and may be executed as a service or micro-service. Network 20 includes a number of physical devices (e.g., servers) and virtual devices (e.g., containers). The present disclosure may refer to a module to generally reference any discernable hardware component, software component, or hardware/software component but, in some instances, refer to alternative terms with same or similar meanings. While "module" is used in a number of places, alternative terms such as "consumer". "client", "service", "processor", "adapter", and/or the like may substitute for "module" and in some instances, vice versa.

As illustrated by and described herein for FIGS. 1-5, there are a number of sources of network topology information and device profile information, and publisher module 78 maintains network state information 66 as a local store for at least some of the global network state information available to the network controller. Publisher module 78 runs the publisher micro-service to ensure that any subscriber client can make advantageous use of state information. In service provider network 20 of FIG. 1, any consumer of state information may establish a subscription for datasets of state information and become a client of the notification service. When these micro-services subscribe, via the network controller, to the notifications service to receive these updates, these micro-services may be referred to herein as consumer, clients, subscribers, subscriber clients, or any combination thereof.

A module, application, or other component of controller, such as SDN controller 40, may initiate the example process by invoking publisher micro-service, which may be operated by publisher module 78. Publisher module 78 may configure the notifications service to run anywhere in the network including the controller itself. Publisher micro-service sends updates to the global network state information maintained in local/remote data stores of network state information. There are a number of mechanisms publisher module 78 may employ for identifying these updates and a number of examples are described herein.

Figure 2:
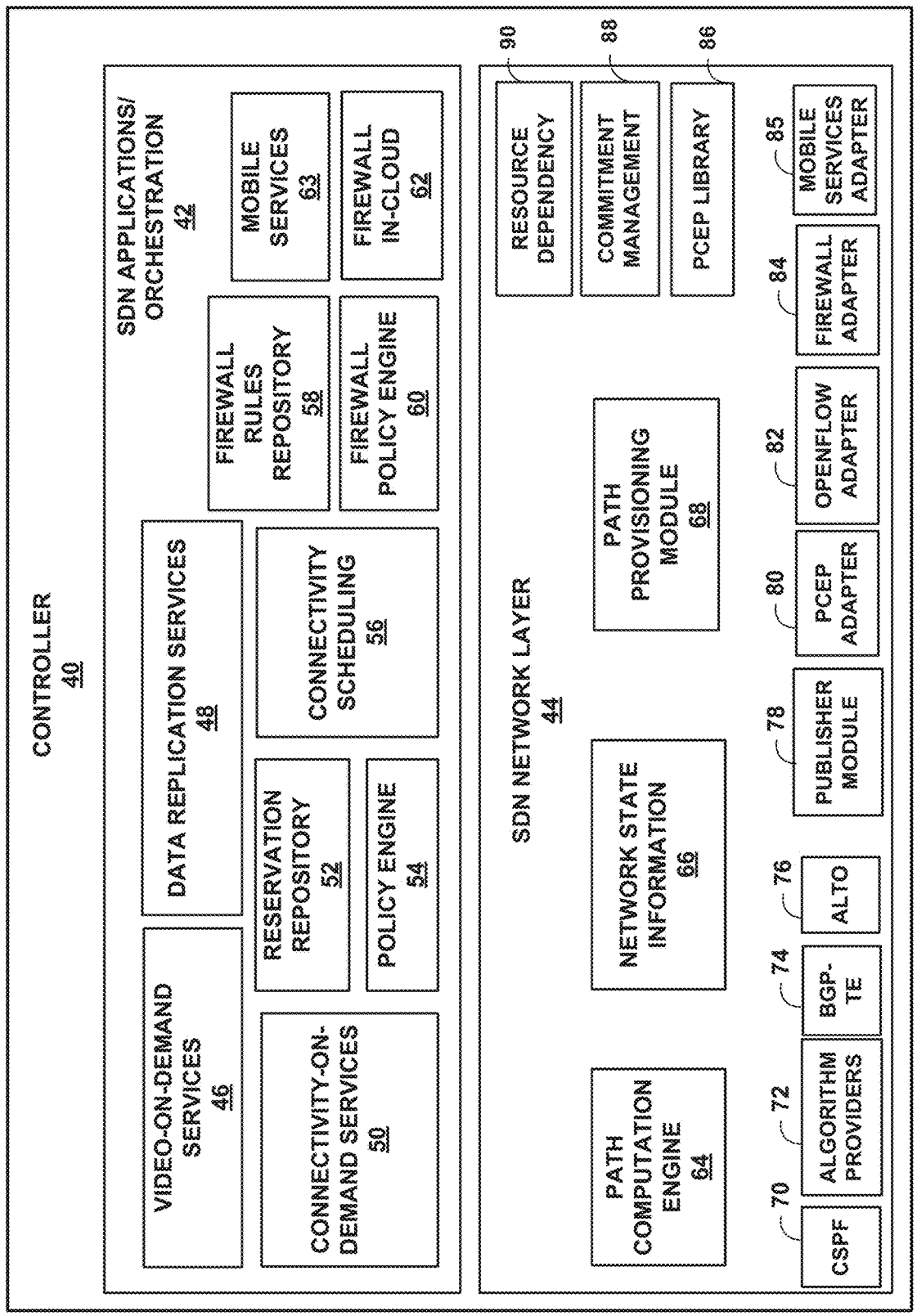
FIG. 2 is a block diagram illustrating an example controller that operates in accordance with various aspects of the techniques described in this disclosure.

FIGS. 2-5 illustrate examples where some source provides these updates to the controller, such as SDN controller 40 of FIG. 2, for consumption by (e.g., a micro-service operated by) at least one module/application and (in most cases) publisher module 78 running the publisher micro-service. There are number of ways for publisher module 78 and publisher micro-service to receive and/or identify these updates. Once identified, the publisher micro-service determines whether any client(s) or subscriber client(s), which may be one or more modules and/or one or more applications in that controller, desire(s) notification of these updates.

FIGS. 2-5 further illustrate examples where publisher module 78 receives updates to the global network state information in some form and configures the notifications service to maintain up-to-date global network state information while monitoring distribution of event notifications if any subscriber client desires new network topology information and/or new device profile information, for instance. As described, for instance, in FIG. 5, a subscription includes attribute values corresponding to subscribed datasets and any matching dataset is to be communicated to the subscriber client in either the event notification itself or in another message. Publisher module 78 may be configured to define a subscription with a variety of attributes. In one example, for a wireless device in a mobile service provider network, subscription attributes may determine a device state (e.g., device profile) using data specifying the wireless device as a subscriber device in a radio access network, a cell, a base station, or another mobile or radio network resources. For a network device in another service provider network, subscription attributes may identify the network device as a node such as a router with node_id, a port_id, a session id, tunnel id, and/or the like. Each device profile or network topology may describe a wireless device or a network device with various data, such as routing and forwarding information, identities of available applications, addresses of accessible connection points and their corresponding communication protocols, and/or the like.

Publisher module 78 may be configured to provide input to any client in the controller and is configured to consume network state and device state information. One example subscriber may use the one or more databases to compute the network configuration based on the new network topology and/or the new device profiles. The example subscriber (or another module in the controller) may program network devices with the network configuration.

The publisher micro-service may be operative to forward each event notification or only a subset of event notifications to the module/application who is a subscriber. In one example, removing each event notification corresponding to an update that is no longer valid for some reason (e.g., a stale update) such that its removal further reduces the latency in the new network configuration implementation. As another technique, for an iteration of a sleep timer of first thread 106A, second thread 106B may read the updates to the global network state information in the incoming event notification and generate indicia to identify the subset of updates to use for computing the network configuration. Example indicia may identify recent updates including an update that supercedes a previous update. First thread 106A may read new network topology information and/or new device profile information by focusing data read operations to the subset of updates.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18 may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes a centralized controller 35 that orchestrates various end-to-end solutions across various network devices of FIG. 1. As described in further detail below, the SDN controller 35 delivers a feedback loop mechanism between the network and client applications in both directions. Via controller 35, applications can inform devices in service provider network 20 of certain requested aspects such as service-level agreements (SLAB) or guarantees. The SDN controller 35 brings the application and service provider network 20 together so that service provider network 20 can adapt to the needs of the applications, and so that the applications can adapt to the changing service provider network 20. In this manner, controller 35 provides a mechanism for real-time application-to-network collaboration.

Aggregation network 24 provides transport services for network traffic associated with subscribers 18. Aggregation network 24 typically includes one or more aggregation nodes ("AG") 19, such as internal routers and switches that provide transport services between access nodes (AXs) 28, 36 and edge routers (ERs) 30. Aggregation nodes 19 are nodes which aggregate several access nodes 28, 36. After authentication and establishment of network access through access network 27 or radio access network 25, any one of subscriber devices 18 may begin exchanging data packets with public network 22 with such packets traversing AXs 28, 36 and AGs 19. Although not shown, aggregation network 24 may include other devices to provide security services, load balancing, billing, deep-packet inspection (DPI), and other services for mobile traffic traversing aggregation network 24.

As described herein, controller 35 operates to provide a central configuration point for configuring AGs 19 of aggregation network 24 provide transport services to transport traffic between AXs 28, 36 and edge routers 30. AGs 19 may, for example, operate as label switched routers (LSRs) that forward traffic along transport label switched paths (LSPs) defined within aggregation network 24. Access nodes 28, 36 and edge routers 30 may operate as endpoints for the LSPs to map subscriber traffic into and out of the LSPs. For example, edge routers 30 may map network services to individual LSPs within aggregation network 24, while access nodes 28, 36 map the network services to individual end points (EPs) 32, 38 via the LSPs, Controller 35 traffic engineers the LSPs through aggregation network 24 according to the bandwidth, Quality of Service (QoS) and availability requirements of network services applications, as further described below.

As further described below, controller 35 includes a path computation module (PCM) that handles topology computation and path provisioning for the whole of aggregation network 24. That is, the PCM of controller 35 processes topology information for aggregation network 24, performs path computation and selection in real-time based on a variety of factors, including current load conditions of subscriber traffic, and provisions the LSPs within the aggregation network.

AXs 28, 36 and ERs 30 operate at the borders of aggregation network 24 and, responsive to controller 35, apply network services, such as authorization, policy provisioning and network connectivity, to network traffic associated with subscribers 18 in communication with access nodes 28, 36. In the example of FIG. 1, for ease of explanation, service provider network 20 is shown having two access nodes 28, 36, although the service provider network may typically service thousands or tens of thousands of access nodes.

In this example, service provider network 20 includes an access network 27 with an AX 36 and EP 38 that provide subscriber devices 18A with access to aggregation network 24. In some examples, AX 36 may comprise a router that maintains routing information between subscriber devices 18A and aggregation network 24. AX 36, for example, typically includes Broadband Remote Access Server (BRAS) functionality to aggregate output from one or more EPs 38 into a higher-speed uplink to aggregation network 24. Edge router 30 provides an anchor point of active sessions for subscriber devices 18A. In this sense, edge router 30 may maintain session data and operate as a termination point for communication sessions established with subscriber devices 18A that are currently accessing packet-based services of public network 22 via aggregation network 24.

EP 38 may communicate with AX 36 over a physical interface supporting various protocols, EP 38 may comprise a switch, a router, a gateway, or another terminal that operates as a demarcation point between customer equipment, such as subscriber devices 18B, and service provider equipment. In one example, EP 38 may comprise a digital subscriber line access multiplexer (DSLAM) or other switching device. Each of subscriber devices 18A may utilize a Point-to-Point Protocol (PPP), such as PPP over Asynchronous Transfer Mode (ATM) or PPP over Ethernet (PPPoE), to communicate with EP 38. For example, using PPP, one of subscriber devices 18 may request access to aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include a radio access network 25 with an access node (AX) 28 and EP 32 that provide subscriber devices 18B with access to aggregation network 24 via radio signals. For example, EP 32 may be connected to one or more wireless radios or base stations (not shown) to wirelessly exchange packetized data with subscriber devices 18B. EP 32 may comprise a switch, a router, a gateway, or another terminal that aggregates the packetized data received from the wireless radios to AX 28. The packetized data may then be communicated through aggregation network 24 of the service provider by way of AGs 19 and edge routers (ERs) 30, and ultimately to public network 22.

Aggregation network 24 provides session management, mobility management, and transport services to support access, by subscriber devices 18B, to public network 22. Edge router 30 provides an anchor point of active sessions for subscriber devices 18B. Edge router 30 may maintain session data and operate as a termination point for communication sessions established with subscriber devices 18B that are currently accessing packet-based services of public network 22 via aggregation network 24.

In some examples, one or more of access network 27 and radio access network 25 may comprise an optical access network. For example, AX 36 may comprise an optical line terminal (OLT) connected to one or more EPs or optical network units (ONUs) via optical fiber cables. In this case, AX 36 may convert electrical signals from aggregation network 24 to optical signals using an optical emitter, i.e., a laser, and a modulator, AX 36 then transmits the modulated optical signals over one or more optical fiber cables to the CPEs, which act as termination points of the optical access network. As one example, EP 38 converts modulated optical signals received from AX 36 to electrical signals for transmission to subscriber devices 18A over copper cables. As one example, EP 38 may comprise a switch located in a neighborhood or an office or apartment complex capable of providing access to a plurality of subscriber devices 18A. In other examples, such as fiber-to-the-home (FTTH), EP 38 may comprise a gateway located directly at a single-family premise or at an individual business capable of providing access to the one or more subscriber devices 18A at the premise. In the case of radio access network 25, the EPs may be connected to wireless radios or base stations and convert the modulated optical signals to electrical signals for transmission to subscriber devices 18B via wireless signals.

The following description introduces, by way of a conceptual foundation, a number of examples where techniques of the present disclosure improve a network, such as a mobile service provider network. Some of the following examples leverage controller 35 to reduce latencies in software-defined networks (e.g., in a data center) and related protocols in support operations of subscriber devices 18 and data plane/control plane functionality of at least one network device within aggregation network 24 (e.g., mobility-specific aspects of control plane functionality of specialized devices within a mobile core). A typical mobile service provider network (or mobile network or a service provider mobile network) includes a core packet-switched network (the "mobile core"), a transport network, and one or more radio access networks. The mobile core establishes logical connections, known as bearers, among the many support nodes on a path between a subscriber device, attached to one of the radio access networks, and a packet data network (PDN). The support nodes utilize the bearers to transport packet-based subscriber traffic exchanged between the subscriber device and the PDN, which may include, for example, the Internet, an enterprise intranet, a layer 3 VPN, and a service provider's private network. Various PDNs provide a variety of packet-based data services to subscriber devices to enable the subscriber devices to exchange service data with application or other servers of the PDNs. The increasing number of services available to an increasing number of mobile subscriber devices pressures available mobile network resources.

A service provider operates service provider network 20 to provide network access, data transport and other services to subscriber devices 18. While illustrated and described with respect to a Long Term Evolution (LTE) architecture, in general, service provider network 20 may implement any commonly defined cellular network architecture including those defined by standards bodies, such as a Global System for Mobile communication (GSM) Association, a 3rd Generation Partnership Project (3GPP), a 3rd Generation Partnership Project 2 (3GGP/2), an Internet Engineering Task Force (IETF) and a Worldwide Interoperability for Microwave Access (WiMAX) forum. For example, service provider network 20 may implement one or more of a GSM architecture, a General Packet Radio Service (GPRS) architecture, a Universal Mobile Telecommunications System (UMTS) architecture, 5G NR (New Radio Access Technology (RAT)) standard, and LTE, each of which are standardized by 3GGP. 5G NR is a global standard for the air interface of 3GPP 5G (fifth generation) mobile networks and, in particular, was developed by 3GPP for broadband cellular networks. Service provider network 20 may, alternatively or in conjunction with one of the above, implement a code division multiple access-2000 ("CDMA2000") architecture. Service provider network 20 may, again as an alternative or in conjunction with one or more of the above, implement a WiMAX architecture defined by the WIMAX forum.

An example subscriber device 18B is a wireless communication device that may represent, for example, a cellular or mobile smart phone and feature phone, a tablet computer, a laptop or desktop computer having, e.g., a 3G wireless card, a wireless-capable netbook, a video game device, a pager, a smart phone, or a personal data assistant (PDA) Subscriber device 18B may run one or more applications, such as cellular voice calls, video games, videoconferencing, video-on-demand, and email, for instance. Certain applications running on subscriber device 6 may require access to services offered by AN 24. Subscriber device 18B may also be referred to, in various architectural embodiments, as User Equipment (UE) or a Mobile Station (MS).

Again, while described herein with respect to one or more particular architectures for illustration purposes, service provider network 20 may implement the mobile network using any architecture including those set forth by any standards body and those proprietarily owned. The techniques therefore should not be limited to cellular network architecture referenced herein. SGW 14 PGW 16, and other elements of mobile core network 10, as well as RAN 8 may, therefore, each represent an abstraction of devices found within any one of the above cellular network architectures.

In the mobile network, the mobile core network such as AN 24, RAN 25, subscriber device(s) 18B, and the service provider, using SDN controller 35 as a transport, cooperate to establish and operate traffic bearers that, in combination, constitute one or more service bearers to transport user service traffic, in the form of PDP packet data units (PDUs), between subscriber device 18B and AN 24. A traffic bearer is a set of network resources and data transport functions in service provider network 20 to deliver user traffic between two network entities. A traffic bearer may include a path, a logical connection, or a physical or wireless connection between two network devices. A service bearer is a traffic bearer assembled from shorter traffic bearers, or "sub-bearers," to provide a PDP bearer service. For example, a particular service bearer between subscriber device 18B and AN 24 (e.g., including public Internet 22) may be operated according to session data and various protocols executing on subscriber device 18B, elements of RAN 25, and elements of AN 24. The service bearer is the logical connection between subscriber device 18B and a node that interfaces with AN 24 (e.g., via a reference point). The service bearer may include an external traffic bearer that carries PDUs from the node to AN 24. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, the entire contents of each being incorporated herein by reference.

Nodes in AN 24 and/or RAN 25 exchange signaling messages with subscriber device 18B to establish and maintain service sessions over AN 24 during which PDUs are transmitted and received. Subscriber device 18B may obtain, via an example service session, data and/or computing services from resources in a data center. Data center may represent a specialized facility external to mobile core network that provides data serving and backup as well as other network-based services for subscribers and other entities. Data center may, for instance, represent a single facility that hosts all of the infrastructure equipment, such as networking and storage systems, servers, redundant power supplies, and environmental controls. Alternatively or in addition, data center may represent one or more servers executing general-purpose hardware to provide computational resources for the control plane entities. Data center may represent a cloud service offered by a separate cloud service provider or may be located within service provider network 20. In some instances, each of control plane entities and SDN controller 35 execute on a single computing device. Various instances of data center may execute more, fewer, and/or different types of control entities for a mobile core network.

AN 24 and/or controller 35 provide aspects of control plane functionality for mobile core network. For example, AN 24 provides control plane functionality conventionally via a PGW/GGSN or similar gateway entity of a mobile core network, including UE PDP address allocation, subscriber management, bearer setup/binding and management, Dynamic Host Configuration Protocol (DHCP) functions, and accounting per UE and bearer. As another example, AN 24 provides control plane functionality conventionally provided via an SGW/SSGN or similar support node of a mobile core network, including mobility anchoring, packet routing, inter-operating charging, lawful interception, and bearer setup/binding and management. As a still further example, AN 24 provides functionality conventionally provided via an MME, SGSN, or similar mobile management entity of a mobile core network, including Network Access Stratum (NAS) signaling and security, inter-core network node signaling for inter-3GPP access network mobility, PGW and SGW selection, roaming, authentication, authorization, bearer setup and management, lawful interception of signaling traffic, and so forth. As an alternative to specialized devices in AN 24, controller 35 may perform functionality conventionally provided by any other above entities and having access to recent network state information allows controller 35 to provide better service.

Instead of specialized devices within the mobile core of a service provider mobile network, controller 35 and the data center (e.g., a cloud-based data center) perform mobility-specific aspects of control plane functionality using network state information. In some examples, mobile core control plane applications such as subscriber session setup, authentication, charging, and signaling execute on general-purpose hardware of the data center intermediated with the mobile core by a software-defined networking (SDN) controller. Subscriber devices issue service requests via radio access networks toward the mobile core, which in turn redirects the control plane messages to the SDN controller to encapsulate the control plane messages within a SDN protocol. For each such service request from a subscriber device, the mobile core control plane applications of the data center behind the SDN controller extract and process the control plane messages for subscriber session management. As examples, the data center, via controller 35, may provide, for example, bulk data delivery, voice over Internet protocol (VoIP), Internet protocol television (IPTV), Short Messaging Service (SMS), Wireless Application Protocol (WAP) service, or customer-specific application services.

As illustrated in FIG. 1, aggregation network (AN) 24 generally includes a number of devices that form one or more packet data networks. Aggregation network 24 nodes may include a router, a switch, a gateway, or any other network device. Aggregation network (AN) 24 may represent, for instance, a local area network (LAN), a wide area network (WAN), the Internet, a virtual LAN (FLAN), an enterprise LAN, a layer 3 virtual private network (VPN), an Internet Protocol (IP) intranet operated by the mobile service provider that operates service provider network 20, an enterprise IP network, or some combination thereof. In various embodiments, AN 24 is connected to a public WAN, the Internet, or to other networks. As a packet data network, AN 24 executes one or more packet data protocols (PDPs), such as IP (IPv4 and/or IPv6), X.25 or Point-to-Point Protocol (PPP), to enable packet transport for services.

When operating as the mobile core network for the mobile service provider network included in service provider network 20, a node of AN 24 receives device data (e.g., device profile information) from radio access network (RAN) 25 and via GPRS, sends mobile device data to a notification service. The notification service, via a software-defined networking (SDN) interface, sends messages to controller 35 that conforms to an SDN protocol and direct processing as a control entity. The mobile device data may include mobile device profiles and/or mobile core network topology information.

A node (e.g., support node) in AN 24 may operate as a notification service for controller 35 and may upload events via SDN interface in accordance with a protocol (e.g., OpenFlow protocol). For example, the notification service node may process subscriber data traffic to identify changes to device profiles and/or network topology, which may trigger sending an event notification for each change. The notification service node may follow an event policy configured with definitions for each event to forward to controller 35. In some instances, the notification service node may maintain global network state information in one or more databases (e.g., using OpenFlow table flow entries).

The techniques described above are examples that permit a support node to present an SDN interface to expose its data plane for software-defined networking by communication with SDN controller 35. In addition to accessing the global state information, controller 35 may perform mobility-specific functionality of the data plane, reducing resource utilization requirements for the node in AN 24 and improve the scalability of nodes in AN 24.

Certain nodes of AN 24 include routing units that are primarily responsible for maintaining routing information base (RIB) to reflect the current topology of network system 10 (or subscriber devices 18, specifically) and other network entities to which it is connected. In particular, the routing unit periodically updates RIB to accurately reflect the topology of the network 20 and other entities. Routing unit also includes routing protocols that perform routing operations, including protocols for establishing tunnels, such as VPNs and optionally LSPs, through a network.

As illustrated in FIG. 1, radio access network (RAN) 25 may include a cellular radio access network for the mobile service provider network provided by service provider network 20. A typical cellular radio access network is a collection of cells that each includes at least one base station capable of transmitting and relaying signals to subscribers' wireless devices (e.g., subscriber devices 18B). A "cell" generally denotes a distinct area of a mobile network that utilizes a particular frequency or range of frequencies for transmission of data. A typical base station is a tower to which are affixed a number of antennas that transmit and receive the data over the particular frequency. Subscriber devices 18B, such as cellular or mobile phones, smart phones, camera phones, personal digital assistants (PDAs), and laptop computers, may initiate or otherwise transmit a signal at the designated frequency to the base station to initiate a call or data session and begin transmitting data. Radio access network 25 connects subscriber device 18B to the mobile core network of AN 24 and provides access control, packet routing and transfer, mobility management, security, radio resource management, and network management. Radio access network 25 may comprise, for example, a GSM Radio Access Network (GRAN), a WiMAX radio access network, a UMTS Radio Access Network (UTRAN), or an evolution of a UTRAN known as an E-UTRAN.

When configured as the mobile service provider network, service provider network 20 converts cellular signals, e.g., Time Division Multiple Access (TDMA) signals, Orthogonal Frequency-Division Multiplexing (OFDM) signals or Code Division Multiple Access (CDMA) signals, received at a base station from subscriber devices into Internet protocol (IP) packets for transmission within packet-based networks.

A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UNITS) architecture, an evolution of UMTS referred to as Long Term Evolution (LTE), mobile IP standardized by the Internet Engineering Task Force (IETF), as well as other standards proposed by the 3rd Generation Partnership Project (3GPP), 3rd Generation Partnership Project 2 (3GGP/2) and the Worldwide Interoperability for Microwave Access (WiMAX) forum.

The mobile core network of AN 24 and RAN 25 may communicate over a backhaul network (not shown) that includes land-based transmission lines, frequently leased by a service provider for mobile service provider network, to transport subscriber data and control traffic between RAN 25 and the mobile core network of AN 24. The backhaul network may include network devices such as aggregation devices and routers.

The mobile core network of AN 24 provides session management, mobility management, and transport services between RAN 25 and the PDN (e.g., a cloud-based data center) of AN 24 to support access, by subscriber device 18B, to PDN services. The mobile core network may represent, for instance and in accordance with one of the example cellular network architectures listed above, a general packet radio service (GPRS) core packet-switched network, an IP-based mobile multimedia core network, or an Evolved Packet Core (EPC). Mobile core network 10 includes support nodes including packet gateway (PGW) 16 that provides firewall, billing, deep-packet inspection (DPI), and other services for subscriber data traffic traversing the mobile core network. PGW 16 operates as a gateway to PDN 12 and may in other architectural embodiments represent, for example, a Gateway GPRS Serving Node (GGSN) or Access Gateway (aGW). Support nodes of mobile core network 10 also include serving gateway (SGW) 14 that provides mobility support by serving as the local mobility anchor for base station handover and inter-network mobility. Although illustrated as separate standalone devices, SGW 14 may be integrated with PGW 16 in some instances.

In some examples of service provider network 20, a mobile service provider network may leverage controller 35 for software-defined networks (e.g., in a data center) and related protocols to support operations of subscriber devices 18 and data plane/control plane functionality of at least one network device (e.g., mobility-specific aspects of control plane functionality of specialized devices within a mobile core).

Controller 35 is an SDN controller that consists of several main logical pieces: 1) South-bound protocols for configuring and enabling functionality in network devices, 2) A topology manager that maintains the network topology, 3) Core modules/plugins (like Traffic engineering database, Path computation engine) that enable applications, 4) Core applications that use the protocols to provide functionality (like PCE server and OpenFlow controller), 5) User-oriented applications that solve end to end use-cases, and 6) Northbound interfaces that enable users/user-apps to talk to the Controller 35.

Modules of controller 35 can communicate using open interfaces, so that each module can be independently replaced to serve a special-purpose application or network orchestration need. Controller 35 is configured such that new modules can be added at various layers (like application layer) while re-using the functionality provided by modules at other layers. Controller 35 can communicate with other controllers at the network layer and/or the application layer to carry out the desired user functionality.

Some examples of applications that controller 35 can interface with that solve end to end use-cases include Connectivity on-demand, Firewall in-cloud, video on demand, data replication, automatic service creation (e.g., for mobile), and the like. By having a modular design, the techniques of this disclosure can provide incremental value-added services on an extensible controller 35. The plugin model allows for a third party plugins (like a different path computation engine) to be plugged into controller 35 to provide differentiated services. An example of this would be the Topology service, where static network topology file or an active topology feed using Border Gateway Protocol Traffic Engineering (BGP-TE) are allowed. The plugins and controller apps provide RESTful APIs to application programmers. An example would be an Application-Layer Traffic Optimization (AT TO) engine that would use the topology service and provide a RESTful interface to the ALTO clients. A RESTful web service (also called a RESTful web API) is a web service implemented using Hypertext Transfer Protocol (HTTP) and the principles of Representational State Transfer (REST).

In addition to the above and in further of support service provider network 20, controller 35 may running services (e.g., network services) where one or more modules (e.g., mobile core network modules) and/or one or more applications use interfaces (e.g., networking protocol interfaces) to exchange data while completing tasks for one or more devices, including subscriber devices 18 and/or any network device in AN 24. In some examples, a number of support modules are configured perform some portion of the functionality provided by the above-mentioned modules, including the core modules and the above topology manager. One example module, which may be referred to as a publisher module, is configured to create and maintain a data source for up-to-date global network state information. As described herein, the global network state information may include any data item (e.g., tuple) describing some aspect of service provider network 20 and state information for RAN 25, AN 27, and/or any other network (e.g., virtual network) of service provider network 20 including any device in any these networks.

The present disclosure describes, in a number of examples, a module and/or an application of controller 35 receiving network node data (e.g., data describing a topology of service network provider 20 or, for the sake of brevity, network topology information) and/or subscriber device data (e.g., data describing a device profile of subscriber device 18 or, for the sake of brevity, device profile information) when configured to operate as a (passive) listener for global network state information event notifications. The present disclosure further describes additional examples of global network state information, but such information is not so limited and, as envisioned by the description herein, may include any useful information supporting service provider network 20. In addition to subscriptions to well-known examples of network topology information or device profile information, client modules/applications may request user-defined datasets in other implementations of controller 35.

Examples of such a data source may be configured in a different host (e.g., a different container or an external device) than controller 35, such as a communicatively coupled to one or more nodes in AN 24. An alternative example data source may be in a same host (e.g., a same device or same container). To modules/applications running in controller 35 and regardless of whether the data source is operating remotely or locally, the above data source arranges the up-to-date global network state information as a number (e.g., a sequence) of events (e.g., keyspace events) indicating changes to the topology of service provider network 20 and changes to device profiles. Changes to the network topology include add events, delete events, update events, and/or the like. Add events, for instance, may indicate new learned paths including new routes between devices within service provider network 20 and new routes between an internal device and an external device (e.g., of an external network.

Changes to device profiles may also include add events, delete events, update events, and/or the like. Add events may indicate (recent) creations of new profiles for new subscriber devices, new network routers, switches, and other nodes, new external network nodes, new specialized nodes, and/or the like. Delete events for either device profiles or the network topology may indicate removals of any device profile or any learned path. Delete events may be followed by add events indicating rebuilding of a device profile. Update events may indicate updated network topology information and/or updated device profiles. An administrator (via a command line interface (CLI)) or controller 35 may perform actions modifying the topology of service provider network 20 and/or modifying device profiles of subscriber devices 18, which may prompt the notification service to distribute update events. A user of subscriber device 18B may trigger (or otherwise cause/control) rebuilding of its device profile in the global state information.

As described herein, the notification service may open, as a communication channel, an interface to the data source on behalf of the client modules/applications running in controller 35 and, using the interface, receive new/updated global network state information to store in one or more databases and then, distribute in a plurality of event notifications. As an alternative, the event notification includes a reference (e.g., a hyperlink) to a remote storage location of the new/updated global network state information. In some examples, the notification service may be executed on controller 35 or, as alternatives, on a remote centralized computing environment and/or distributed computing environment. In some examples, the client modules/applications specify, in a subscription, a portion of a device profile (e.g., device state) and/or path information including that device's topology (e.g., neighbor nodes) and established routes to that device.

In some examples, controller 35 executes software code for the above publisher modules and generates an instance of a publisher micro-service with the above communication channel to a source. On behalf of the client modules/applications, the publisher micro-service may execute a first thread and a second thread to operate (e.g., in parallel) and handle incoming event notifications (e.g., in a batched process). In some examples, the publisher micro-service establishes a sleep timer with the configurable time period for (iteratively) processing event notifications in intervals between iterations of a configurable time period; when the configurable time period elapses, the second thread may process event notifications received in a previous iteration for updates to the global network state information.

In some examples, for the benefit of the client modules/applications, the first thread and/or the second thread function as a fetching mechanism for updates to some aspect of the network topology and/or changes to some aspect of a device state/profile. The second thread may be further configured to reset an event counter for a next iteration of the sleep timer. The second thread may be configured to pause or continue listening for future event notifications when the configurable time period elapses. The second thread may be further configured to lock an event counter or increment the event counter in response to receiving each future event notification during an iteration of the sleep timer such that, in some examples, the second thread may be further configured to reset the event counter for a next iteration of the sleep timer.

In some examples, the configurable time period may be a first configurable time period and for the benefit of one or more second client modules/applications, a third thread and/or a fourth thread function as a same or similar fetching mechanism for updates to some aspect of the network topology and/or changes to some aspect of a device state/profile. The third thread and the fourth thread may be executed by the processing circuitry in controller 35 for providing the updates to at least a second subscriber micro-service of the plurality of subscriber micro-services. The third thread is configured to start a sleep timer and/or wait for a second configurable time period while the fourth thread receives the one or more event notifications from the notification service, and when the second configurable time period elapses, the third thread reads the at least one update to the portion of the global network state information in the one or more received event notifications. The second configurable time period and the first configurable time period may be set to a same amount of time. In other examples, the second configurable time period may be different than the first configurable time period.

Based on the updates, the client request, from the data source, any new network topology information and/or new device profile information according to the processed events. Hence, the client modules/applications may practice batch event processing. In other examples, the client modules/applications may read new network topology information and new device profile information based on only a subset of the updates to the global network state information in the event notifications received during the previous iteration. Coalescing is one technique where events (e.g., sequential events) are aggregated or combined into a single event and/or eliminated altogether because, for some reason, the events are no longer valid. As one example of coalescing events, a sequence of events indicating continuous updates to a device profile where a last event is a delete event for the device may be removed by the client modules/applications because the device is no longer online nor in the new global network state.

There are number of benefits and advantages to having such as data source, such as a reduced latency for controller 35 to implement changes to network state. The publisher module may configure the data source to be accessible to the above-mentioned client modules/applications of controller 35 or modules/applications of a network node in service provider network (e.g., a specialized device). In one example, having available the data source of up-to-date global network state information, network topology information and/or up-to-date device profile information, the client modules/applications enable one or more core modules or one or more core applications to compute a network configuration comprising a new network topology and/or new device states (e.g., new device profiles) based on the up-to-date network topology information and/or up-to-date device profile information and then, implement the network configuration, for example, by programming a plurality of network devices in service provider network 20 with at least a portion of new global state information comprising new network topology information and/or new device profile information. To implement the network configuration, controller 35 is configured with network device protocol interfaces of which the one or more core modules or one or more core applications may use one or more to exchange the new network topology information and/or the new device states with at least one of the network devices.

The present disclosure describes the above data source in support of batched network topology change management by controller 35 of SDN networks or any controller that manages a network of a plurality of network devices and one or more databases configured to store the up-to-date global network state information including network topology information and device profile information for the subscriber devices 18 or network nodes in AN 24.

FIG. 2 is a block diagram illustrating an example controller in accordance with this disclosure. SDN controller 40 is implemented on one or more devices running in the cloud or in the service provider premises, controlling network devices (e.g., nodes) in a network in which it is placed. SDN controller 40 is an example of controller 35 where functionality can be partitioned into at least two layers, software-defined network (SDN) application/orchestration 42 and SDN network layer 44. In one example, a service provider network comprises a software defined network (SDN) and network functions virtualization infrastructure (NFVi) and SDN controller 40 may provide a high-level controller for configuring and managing the routing and switching infrastructure of the service provider network. SDN controller 40 may also provide a high-level orchestrator for configuring and managing core applications/modules and virtualization of network services into service nodes of a data center and/or a cloud service. In some instances, nodes in the data center and SDN controller 40 execute on a single computing device.

SDN controller 40 as described herein is configured to regulate processing (e.g., batch processing) of network state updates, which may include network topology updates and device profile updates, to ensure that various modules and applications have access to an up-to-date network topology and up-to-date device profiles. FIG. 2 illustrates at least some of these modules and applications. SDN controller 40 may dedicate one module to operate as a single source of truth for up-to-date network state information including new network topology information and/or new device profile information. In some examples, publisher module 78 fulfills the dedication by configuring a notifications service in the network with a data source for storing up-to-date global network state information. The notifications service may run on a network device and when an event occurs that changes a topology of the network or one or more device profiles, the notifications service prepares an event notification for distribution to each subscribed client module/application as described herein. A device profile may correspond to a device-object name and publisher module 78 may configure that identifier attribute to enable a subscription to that corresponding profile; accordingly, when an event, such as a rebuilding of the device profile, is triggered, an event notification having that device-object name is sent to subscriber clients in SDN controller 40.

To compute and schedule paths through the network intelligently, one or more modules of SDN network layer 44 or one or more core applications in SDN applications/orchestration layer 42 utilize network topology information, device profile information, and/or any other dataset corresponding to a current/most recent network state. The network topology information describes available resources of the network, for example, available radio resources of a radio access network in a mobile service provider network, available data center resources of a cloud-based service provider network, available resources at multiple layers of a service provider network, and/or other available resources.

Instead of having several external sources—such as a topology server, an overlay controller, routers, and switches, and/or the like—the modules and applications illustrated in FIG. 2 leverage publisher module 78 to provide data from these and other external sources in a single resource, which may include external data store(s), internal data store(s), or both external and internal data store(s). The present disclosure (for the most part) refers to these data store(s) as inclusive of database(s) and database system(s). In some examples, publisher module 78 may configure one or more databases to maintain up-to-date information corresponding to the network's topology of devices and their device states (e.g., as memorized by device profiles). Publisher module 78 may configure a network device to run a notification service (not illustrated) for distributing event notifications to subscriber client modules/applications of SDN controller 40 or in one or more network devices (e.g., subscriber devices).

Publisher module 78, as an alternative, may configure an internal data store to operate as the subscriber client modules/application's single source of truth for up-to-date global network state information. This internal data store may include one or more databases configured to maintain any number of the various examples of the global network state information described herein. The present disclosure refers to the internal data store generally as network state information which is represented in FIG. 2 as network state information 66.

It is possible, in other examples, for publisher module 78 to maintain up-to-date global network state information in neither the above internal data store nor the above external data store. Instead of utilizing a specific device or container to store at least a portion of the above information, publisher module 78 may, in accordance with a client's subscription or a request, retrieve topology information and/or device profile information from other modules/applications running in SDN controller 40. Hence, the notification service may be publisher module 78 itself and such a micro-service may run statically and/or dynamically, such as when instructed/prompted/triggered by a client. Publisher module 78 may configure an external node (e.g., a container or a physical server) to operate as a notification service configured to dynamically respond to subscriptions and/or requests from the client modules/applications with topology information and/or device profile information in satisfaction of client queries or client requirements.

It is also possible for publisher module 78 to maintain up-to-date global network state information in both the above internal data store and the above external data store. In some examples, a client subscription and/or a client request may specify certain datasets to receive, for example, by metadata and/or other attributes (e.g., an identifier) of one or more datasets. This external (support) node may or may not utilize a particular (internal) module/application in SDN controller 40 to operate as a conduit/interface with the clients. In some examples, a client module/application in SDN controller 40 utilizes a corresponding (e.g., special) interface to exchange datasets of state information.

To illustrate by way of example, a client module/application and the notification service may establish a subscription requesting updates to a device's profile having a unique identifier (e.g., a device-object name) and/or updates to a node's topology having a unique identifier (e.g., a node_id identifier). The client may receive event notifications when routing information (e.g., a route) is added, updated, and/or deleted. There may be a number of other event types in addition to add, update, delete events. The notifications service may implement an example event as a keyspace event in accordance with ReDis™ key space event format. There are a variety of different data types and/or formats to implement the above events.

SDN controller 40 maintains, in the network, one or more databases for storing global network state information in general. Publisher module 78 of SDN controller 40 stores, in computer memory of SDN controller, network state information 66 with up-to-date network topology information and/or device profile information for at least a non-trivial amount of time. SDN controller 40, in some examples, stores network state information 66 in an external device, internal storage space (e.g., a hard drive or a flash drive), and/or a memory buffer (e.g., a cache or RAM). The network of SDN controller 40 includes interfaces configured to communicate data between a module/application in SDN controller 40 and an external device (e.g., container/server) corresponding to the notifications service and/or the data source for providing (e.g., new) network topology information and/or (e.g., new) device profile information to the clients in SDN controller 40. In some examples, the client modules/applications utilizing any number of control mechanisms for these interfaces, which may be referred to as protocol interface or network device protocol interfaces, and/or in accordance with any networking protocol may, via one or more of these interfaces, receive event notifications and at least a portion of new network topology information and/or new device profile information (originally) in the one or more databases.

In some examples, the event notifications, the new network topology information, and/or the new device profile information may be transported in messages, such as inter-process communications (IPC), and the one or more interfaces, constituting an inter-process communication (IPC) transport mechanism, may be configured to handle such messages for subscriber clients. In one example, the one or more interfaces are operative to either forward an IPC message to an appropriate subscriber client; first, extract message payload data from the IPC and second, provide that data, as input, to the appropriate subscriber client; or first, extract the message payload data, read each event corresponding to a change/update to the global network state information, and then, provide as input data to the appropriate subscriber client. Hence, the interfaces may be active/passive event listeners, and (if suitable) configured to perform event processing in some manner. For an event notification or multiple notifications, the interfaces of SDN controller 40 may identify one or more events representing at least one update to a network topology and/or a device profile (e.g., device state) and then, perform event processing to some extent on the one or more events. Instead of or in addition to the clients, the interfaces of SDN controller 40 may forward the IPC messages to publisher module 78 and in turn, publisher module 78 performs event processing (to some extent) on the one or more events and then, relays the IPCs messages to the appropriate client.

In some examples, the client modules/applications, publisher module 78, and/or the interfaces running in SDN controller 40, may process a number of events for an update or updates to the global network state information and then, read at least a portion of the new network topology information and/or the new device profile information. In some examples, a thread instantiated by publisher module 78, on behalf of the client modules/applications, may communicate IPC messages to request return of the at least a portion of the new network topology information and/or the new device profile information from the notifications service and/or the above data source for such information. In the number of events, specific datasets of such information and/or specific updates/changes to such datasets may be identified; to benefit, the client modules/applications, publisher module 78, and/or the interfaces running in SDN controller 40 may apply information learned for the identification to request updated information for a network's topology and/or a device state.

As described herein, the number of events mentioned herein may include updates to the global network state information, and in some examples, the client modules/applications, publisher module 78, and/or the interfaces running in SDN controller 40 may determine a subset of the updates to further process, for example, to request the updated information for the network's topology and/or the device state(s). In response to receiving one or more event notifications and by applying a number of techniques, the client modules/applications, publisher module 78, and/or the interfaces running in SDN controller 40 may determine whether to remove/discard the received event notification, an event described in the received event notification, and/or an update to the global network state information corresponding to the event.

In some examples, an IPC message containing an event notification may also contain data corresponding to the event notification, such as an update to a subscriber device state (e.g., a device profile) or an update to a network node's neighbors (e.g., a topology). Any update that is no longer valid is removed for being stale. Hence, the clients in SDN controller 40 ultimately receive only valid information for the new network topology information and/or the new device profile, reducing latency and/or resource costs. Furthermore, the clients only receive datasets corresponding to subscriptions/requests for some aspect of the network topology and/or the device profile, mitigating costs associated with processing invalid (e.g., stale) events.

In the data center, one or more nodes (e.g., servers or containers) may execute logic operative to allocate and utilize available computational resources for subscriber devices of the network of SDN controller 40. The data center may represent a cloud service offered by a separate cloud service provider than the network of SDN controller 40 or may be located within that network. The data center may run compute nodes to execute modules or applications in support of functionality by a mobile core network.

In the mobile core network, one or more nodes (e.g., servers or containers) may execute logic operative to allocate and utilize available resources in the form of radio access or mobile resources. For example, a traffic bearer is a set of network resources and data transport functions in service provider network to deliver user traffic between two network entities, such as between SDN controller 40 and a subscriber device or a router/switch device in the same network. A traffic bearer may include a path, a logical connection, or a physical or wireless connection between two network devices according to communication sessions (e.g., BGP peering sessions) and various communication protocols. The global network state information as described herein may further include the network topology information describing the network's topology as defined by an architecture for (e.g., hierarchy of) network devices. Elements of a radio access network may constitute some of the resources described for the network topology. Subscriber devices having device profiles may be communicatively coupled to one or more these elements such that, in the network's hierarchy, a subscriber device may operate in a level below the router/switch device network node. Other examples of the network topology information may describe other radio access network or mobile core network resources.

Additionally or alternatively, the network topology information describes available resources at multiple layers of the network, and the device profile information describes individual network devices including information to further describe one or more layers of that network. In one example, publisher module 78 stores in network state information 66 one or more traffic engineering databases (e.g., a multi-topology traffic engineering database) of which each database is configured to store topology information for a base network layer and one or more overlay network layers of a network that constitutes a path computation domain for PCE 64. An example traffic engineering database (TED) may organize topology information for respective network layers hierarchically, with the base network topology information supporting the topology information for one or more overlay networks. Paths in a lower-layer topology may appear as links in a higher-layer topology. For example, tunnels (e.g., TE LSPs) created in the base network layer can appears as links in an overlay network TE topology. One or more SDN modules and/or one or more SDN applications may then correlate overlay network links with paths established in the base network layer to efficiently compute paths that cross multiple overlay topologies.

Another example TED may include one or more link-state databases (LSDBs), where link and node data (e.g., in routing protocol advertisements) received from a topology server and/or discovered by link-layer entities such as an overlay controller and then, provided to SDN network layer 44 via the notifications service. Publisher module 78 may identify updates to specific TEDs and store up-to-date topology information for the base network layer and the one or more overlay network layers of the network. In some instances, an operator may configure traffic engineering or other topology information in an example TED within network state information 66 via an operator interface. Other SDN controllers may implement a separate overlay controller interface for each overlay controller operating as an external source.

A base network layer of the service provide network (or "base network") includes network switches connected to hosts and arranged in a physical topology. The network switches receive and forward packet data units (PDUs) for network flows according to a network configuration (e.g., forwarding information) programmed into the switches by an administrator or SDN controller 40 and/or according to forwarding information learned by the switches, whether by operation of one or more protocols (e.g., interior gateway protocols (IGPs)) or by recording information learned during PDU forwarding. Each of the network switches may represent a router, a layer three ("L3") switch, a layer three ("L2") switch, an L2/L3 switch, or another network device that switches traffic according to forwarding information. Accordingly, PDUs forwarded by network switches may include, for example, L3 network packets (e.g., Internet Protocol) packets and/or L2 packets (e.g., Ethernet datagrams or Asynchronous Transfer Mode (ATM) cells). PDUs may be unicast, multicast, anycast, and/or broadcast.

An overlay network layer of the service provider network includes overlay switches arranged in a virtual topology "over" a physical topology defined by network switches. Individual links of the virtual topology of the overlay network (or "overlay links") may be established paths through the base network and/or physical links connecting overlay switches. The overlay network may represent a virtual private network (VPN), an OpenFlow network consisting of one or more OpenFlow switches, or an application-layer network with selection functionality built-in to endpoint devices, for example. Accordingly, each of overlay switches may represent a router or routing instance (e.g., a virtual routing and forwarding (VRF) instance); a Virtual Private Local Area Network (LAN) Service (VPLS) instance; a dedicated L2, L3, or L2/L3 switch; or a virtual or "soft" switch (e.g., an OpenFlow switch) implemented by a router or by a dedicated switch, for example. SDN controller 40 may replace an external entity (e.g., overlay controller) and perform similar functionality.

In one example of network state information 66, publisher module 78 configures one or more databases to store information provided by an external source known as a topology server. Some implementations of SDN controller 40 leverage an entity known as a topology server that receives topology information from network switches, including switches for the base network of a multi-topology network. For example, a topology server may execute one or more IGPs or Exterior Gateway Protocols (e.g., the Border Gateway Protocol (BGP)) to listen to routing protocol advertisements sent by network switches. The topology server collects, stores the base network topology information and then, provides the base network topology information in base topology update messages to other network entities, such as SDN controller 40 and/or the notifications service. The base network topology information may include traffic engineering information for the network links, such as the links' administrative attributes and bandwidth at various priority levels available for use by label-switched paths (LSPs). In some examples, network switches may send topology update messages to topology server that specify L2 link information for L2 links connecting the network switches.

In some examples, the topology server information in network state information 66 may be accessible to publisher module 78 and one or more modules/applications in SDN controller 40, such as a topology manager module. In some examples, publisher module 78 may configure the notifications service with definitions (e.g., of keyspace events) for specific datasets of the topology server information. The topology manager module (e.g., or another core module) may request a subscription to keyspace events for a particular aspect of a network's topology and/or a device's state and in turn, publisher module 78 sends the subscription and appropriate definitions for the keyspace events. As requested, the notifications service configures one or more database queries to retrieve data according to the subscription and generate a number (e.g., a sequence) of keyspace events indicating updates to the global network state information.

Similarly, in another example of network state information 66, publisher module 78 may configure one or more databases to store overlay network information. Publisher module 78 may receive (e.g., via an overlay controller) topology information for an overlay network of multi-topology network in topology update messages sent by overlay switches in respective communication sessions. Topology update messages sent by overlay switches may include virtual and physical switch port information, PDUs and associated metadata specifying respective ports and/or interfaces on which PDUs are received. In some examples, SDN controller 40, via the overlay controller, is a routing protocol listener that executes one or more routing protocols to receive routing protocol advertisements sent by overlay switches. Such routing protocol advertisements may be associated with one or more VRF's, for instance. Overlay controller collects and stores the overlay topology information, then provides the overlay topology information to SDN controller 40 and/or the notifications service in overlay topology update messages. In some examples of network state information 66, the overlay network information is accessible to publisher module 78 and one or more modules/applications in SDN controller 40, such as the topology manager module. Other SDN controller 40 implementations may include the overlay controller as a component.

In one example of network state information 66, publisher module 78 configures one or more databases to store device state information including device profiles and other device data. In general, an example network device's profile information describes learned paths by that example network device. Network devices such as routers are configured to establish paths with other networks or sub-networks such as in multi-topology network. Network switches may be configured to or otherwise directed to establish paths through a base network of multi-topology network. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance). Network switches provide path status information for paths established through the network (e.g., the base network of multi-topology network) to the notifications service (e.g., via an adaptor) in communication sessions. Path status (alternatively, "path state" or "LSP state") information may include descriptors for existing, operational paths as well as indications that an established path or path setup operation has failed. For example, a network switch may attempt establish an LSP using a reservation protocol such as Resource Reservation Protocol (RSVP) but fail due to insufficient network resources along a path specified by an Explicit Route Object (ERO). As a result, network switch may provide an indication that the path setup operation failed to the notifications service in a communication session. PCE 64 leverages network state information 66 to access path status information and adds established paths through the base network of network as links in the overlay network topology.

In some examples, publisher module 78 stores in network state information 66 one or more databases configured to store routing information and/or forwarding information for learned paths in the network. In addition or as an alternative to the above device profile information, SDN controller 40 may receive, from the topology server or by execution of routing protocols, routing information and/or forwarding information describing the learned paths. As described herein, SDN controller 40 maintains, in network state information 66, any information defining a topology of the network (e.g., a mobile core network), and publisher module 78 efficiently processes updates to the network topology, for example, by storing copies of the routing information and/or the forwarding information in a routing information base (RIB) and/or forwarding information base (FIB), respectively. SDN controller 40 may execute a daemon to store learned routing information and/or forwarding information within routing information base: (RIB) and/or forwarding information base (FIB), respectively. As an alternative, publisher module 78 may configure the notifications service to run a similar routing daemon.

The daemon may run a routing process operative to generate the routing information by resolving a network topology based on protocol messages (e.g., route advertisements), communication sessions (e.g., peering session messages), and/or other learned network paths between devices, to generate forwarding information by further resolving the network topology defined by the routing information, and then (if needed) select or determine one or more routes through the network or a sub-network (e.g., a mobile core network).

In addition to at least one of a traffic engineering database, a multi-topology traffic engineering database, the routing information base, or a forwarding information base, publisher module 78 may, for network state information 66, configure one or more databases to store an application-layer traffic optimization (ALTO) map and/or other examples of high-level network topology information. In other examples, SDN controller 40 implements publisher module 78 to store, in network state information 66, network topology information for ALTO 76 to use to produce the ALTO map. Whenever an update or a change is made to such topology information, publisher module 78 is configured to publish to the notifications service information for such an update or change, and in response, the notifications service distributes, to any subscribing/requesting client modules/applications, an event notification for that update or change.

In this way, each client module/application has access to network topology information for each service barrier or network layer originated or forwarded by routing protocol speakers of the network. The received topology information describes the topology of network nodes (e.g., routers, switches, and other network devices) and reachability of network address prefixes by any of network routers.

The techniques of this disclosure may provide one or more advantages. For example, SDN controller 40 improves operational efficiency, as the network is automatically configured (without human intervention) when the network state transitions or changes due to one or more reasons. Some example techniques achieve latency reductions in the interval between an occurrence of the transition/change and a propagation of that transition/change to other devices through the network and a second interval between SDN controller 40's notification of that transition/change and SDN controller 40's network reconfiguration to conform the network's topology and its devices' states. To accomplish a latency reduction according to one example technique, SDN controller 40 implements a publisher-subscriber model for distributing new network topology information and/or new device profile information. To illustrate, in response to identifying a change in the network topology or to a device profile, SDN controller 40 has any new information published and then, distributed to subscriber clients (assuming a matching subscription) and any invalid information removed and its removal disseminated to other network device.

In the course of publishing new information, SDN controller 40 may overwrite information that has been rendered invalid in view of the change in the network topology/device profile; examples of over-written information include previous network topology information or previous device profile information. SDN controller 40 may send the new network topology information and/or new device profile information to a network addressable data source at which the new information is used in updating a previous network topology and/or a previous device state (e.g., device profile)

and from which each subscriber client is notified that one or more updates have been made to the network topology and the device profiles. The network addressable data source may proceed to maintain up-to-date network topology information and/or device profile information for advantageous use by client module/applications in SDN controller 40.

PCE 64 presents an interface by which clients may request, for a specified time, a dedicated path between any combination of hosts. For example, client may request a 100 MB/s path from host A to host B from 1 PM to 3 PM on a particular date. As another example, client may request a 50 MB/s path from host B to host C from 2 PM to 3 PM on the same date. As a still further example, client may request a mesh (or "multipath") of 50 MB/s paths connecting each of hosts to one another from 4 PM to 6 PM on a particular date. The requested mesh is a multipoint-to-multipoint path consisting of multiple point-to-point paths. In addition to the bandwidth, hosts, and time path parameters exemplified above, clients may request paths that conform to other quality of service (QoS) path request parameters, such as latency and jitter, and may further specify additional associated classifiers to identify a flow between the specified endpoints. Example flow classifiers (or "parameters") are provided below.

PCE 64 uses base network topology information for the network received from topology server, overlay network topology information for network received from overlay controller, and path status information received from network switches to compute and schedule paths between hosts through network that satisfy the parameters for the paths requested by clients.

The SDN controller can also provide greater service agility, as networks can be dynamically modified to support new applications experiences. The SDN controller can also provide capital efficiency, i.e., an ability to do more with less, because networks do not need to be over-built or purpose built for a particular service or application. Rather, network resources can be allocated only when needed and reserved for high priority applications and business critical applications.

There are a number of additional benefits to maintaining information describing a recent network topology and rebuilt device profiles. As one benefit, a specific client application may request an application-specific network configuration and having the most network topology allows controller 40 to ensure that requested application-specific network configuration conforms to the most recent network topology.

In one example, a video server receives a user's request from a video service application on the client subscriber device for streaming video. The video server does not know where the user (e.g., subscriber device) is physically located. Rather than just relying on the video server to make a guess about which data center to send the video traffic from for that subscriber, the video service application on the client can communicate with video-on-demand services module 46 of controller 35 via a northbound interface of video-on-demand services module 46. The video service application on the client can specify to video-on-demand services module 46 the content and the content-type (high-definition or standard definition). In response, the video-on-demand services module 46 can obtain information regarding the closest data center that has the capacity to service the content-type and can indicate to the video service application on the client the data center from which it should fetch the video. For example, video-on-demand services module 46 may pass the request to connectivity scheduling module 56, which may instruct ALTO module 76 to determine the closest server or data center hosting the video based on network state information 78. In some examples, ALTO module 76 may query network state information 78 (e.g., one or more TEDs) for information (e.g., in BGP-TE information) to determine the content server location and then, pass the information up to the connectivity scheduling module 56. Other implementations rely on an ALTO server to store the content server location.

In addition, the video service application on the client can request a bandwidth-guaranteed path (e.g., path having 6 megabits of bandwidth) with certain characteristics. In accordance with the techniques of this disclosure, the video service application on the client can communicate with connectivity-on-demand services module 50 of controller 40, via a northbound interface of connectivity-on-demand services module 50, to request the path. In some examples, connectivity-on-demand services module 50 may reference reservation repository 52, and/or may reference policies applied by policy engine 54. Connectivity-on-demand services module 50 provides the client requirements to path computation engine 64 in SDN network layer 44. In response, the path computation engine 64 computes a path in the network based on network topology information found in traffic engineering database (TED) of network state information 66.

After path computation engine 64 computes the path having the guaranteed bandwidth, the path provisioning module 68 of SDN network layer 44 provisions the computed path in the network. As one example, path provisioning module 68 (or path computation element protocol (PCEP) Adapter 80) provides information to the routers in the network to give the head-end router an indication of the path, such as by providing an Explicit Route Object (ERO). The router signals the path using Resource Reservation Protocol with Traffic Engineering extensions (RSVP-TE) to signal a Multi-Protocol Label Switching (MPLS) LSP. As another example, OpenFlow adaptor 82 may provision the path using OpenFlow. In this manner, controller 40 can provide the video service application on the client with a guarantee from connectivity-on-demand services module 50 that the bandwidth is available on the path through the network chosen by path computation engine 64 and provisioned by path provisioning module 68. Thus, the video service application client was able to not only able to connect to the best data-center that could serve the content, but also reserve network resources to ensure that user gets a great video watching experience.

Having available up-to-date network topology information as described herein enables path computation engine 64's path selection and path provisioning module 68's path provisioning; otherwise, both path computation engine 64 and path provisioning module 68 would be more likely to return errors liable to fail, leaving SDN controller liable to fail or capable of selecting/provisioning invalid paths. The present disclosure describes techniques for maintaining the up-to-date network topology information with a reduced latency. After an event (e.g., user action) occurs changing the network's topology, that change is propagated to SDN controller 40 and made available (upon request or subscription) to any client module/application in SDN controller 40 or another device (e.g., a network node or subscriber device) without significant delay. Even after a substantial number of changes to the network's topology, the techniques described herein leverage subscriber-publish model to propagate those changes throughout the network.

In one example, assume some kind of attack is happening on the Internet (e.g. hackers trying to bring down the Department of Defense website). A network administrator wants to block all traffic coming from a certain set of hosts. Using the northbound API associated with firewall-in-cloud module 62, the network administrator's client device can communicate with controller 40 via a northbound API to request to block the traffic from the hosts. Firewall-in-cloud module 62 converts the instructions into firewall-specific rules that need to be programmed into routers in the network. For example, firewall-in-cloud module 62 may generate a firewall rule such as "if traffic comes from IP address X, then drop," Firer all-in-cloud module 62 may use firewall policy engine 60 and/or firewall rules repository 58 in generating the firewall rules.

Firewall-in-cloud module 62 provides the firewall rules to firewall adapter 84. Firewall adapter 84 programs the appropriate router(s) in the network with the generated rules using commit commands on the router. Commitment management module 88 may be involved in this process. The router uses its usual firewall components, but the firewall rules are received automatically from the firewall adapter 84. In this manner, the network administrator does not need to individually program one or more routers in the network by individual specific configuration commands. Instead, the network administrator can use the northbound interfaces to tell the SDN controller 35 at a high level what outcome is desired in the network. SDN controller 40 breaks down the request into specific configuration commands and configures individual routers in the network with those commands. If the network uses independent, standalone firewall devices that sit at the edges of the network, then the firewall adapter 84 will program the firewall devices (rather the routers) and thus accomplish the same behavior.

In some aspects, SDN controller 40 also can provide a virtualization environment interconnecting two or more data centers, for example. For example, a network administrator may request a data replication event, such as a request to cause data stored at a first data center to be replicated (stored) at a second data center. The network administrator's client device can interact with a northbound API of controller 35 associated with data replication services module 48. Data replication services module 48 receives the request and can invoke connectivity scheduling module 56. Connectivity scheduling module 56 is receiving network topology information, (directly) via an interface to the notifications service and/or (indirectly) at a TED within network state information 66, such as via publisher module 78 or, alternatively, BGP-TE 74. Connectivity scheduling module 56 causes path computation engine 64 to compute a path between the data centers. For example, path computation engine 64 may use CSPF 70 or other algorithm providers 72 for computing a path.

Path provisioning module 68 provisions the path, such as by using PCEP adapter 80 to provide the path ERO to the head end router of the path. For example, the head end router may signal an LSP over the path using RSVP-TE, for sending the data between the data centers enabling the replication. In the case of the data replication, the LSP path may not need to be the shortest or best path, which can be taken into account by path computation engine 64. Connectivity scheduling module 56 may use OpenFlow adapter 82 to map the data stream to the LSP. Multiple data streams can be mapped to the same network path. Connectivity scheduling module 56 can provide path resizing and rerouting based on changing needs, such as changing requests by the network administrator, or changes network state information 66 (e.g., changes to network topology as learned via BGP-TE 74, ALTO 76, or other protocol on the southbound side of SDN network layer 44).

SDN controller 40 can address issues facing customers. For example, as customers continue to adopt virtualization technologies in their data centers, and ramp up on virtual machines, workload mobility, and dynamic resource sharing, this can cause problems in efficient configuration of the network that led to sub-par performance and operational inefficiencies, i.e., too much manual overhead. In accordance with the techniques of this disclosure, SDN controller 40 can reduce the impact of certain problems with data center resource management, particularly across multiple data centers around capacity planning, data center utilization, and efficient operations, by maintaining up-to-date global network state information and coordinating distribution of such information to benefit at least one client.

Connectivity scheduling module 56 may use the above up-to-date global network state information to dynamically reserve bandwidth for client modules/applications in SDN controller 40 and/or in a subscriber device. Connectivity scheduling module 56 interfaces with path computation engine 64 in the SDN network layer 44 of controller 35. Network state information 66 stores base network topology and overlay network topology information (ultimately) from network devices, e.g., via BGP-TE module 74, ALTO module 76, and/or publisher module 78. Path computation engine 64 analyzes the various topologies to reconcile requests from multiple client applications, and attempts to identify paths through a layer or combination of layers of the network that can be established at the requested time in view of the specifications requested for the temporarily dedicated paths and the anticipated bandwidth/capacity available in the network.

Path computation engine 64 schedules the identified paths through the one or more layers of the network to carry traffic for the requested paths. To then establish a requested path, path computation engine 64 instructs path provisioning module 68 to program, at the scheduled time, path forwarding information into one or more network nodes at any layer of the multi-layer, multi-topology network that participates in forwarding traffic along the identified path. For example, path provisioning module 68 may provide the computed path to the head-end router of the path, which in turn uses the path information to signal an LSP along the specified path using RSVP-TE. In another example, path provisioning module 68 may program path forwarding information (e.g., including MPLS labels) directly into each network device along the path. In this way, connectivity scheduling module 56 and path computation engine 64 may establish dedicated bandwidth channels, in the form of reserved paths, through the network as well as steer traffic onto the dedicated bandwidth channels to provide connectivity between distributed client applications, for instance.

The techniques may provide one or more advantages. For example, connectivity scheduling module 56 may have access by operation of path computation engine 64 and network state information 66 to an enhanced view of the current state of the network at multiple different layers, which may enable path computation engine 64 to identify paths that are not visible to a label edge router, for example, having a more limited view. Path computation engine 64 may additionally, by virtue of having access to this enhanced view, steer traffic to underutilized portions of the network to increase the network capacity utilization. Still further, using connectivity scheduling module 56 and path computation engine 64 to identify, establish, and in some cases preempt temporarily dedicated paths for reconciling multiple, possibly conflicting application requests may reduce first-in-time, first-in-right access to network resources in favor of explicit, centralized prioritization of application requests for dedicated paths.

In some examples, a northbound API GUI associated with connectivity scheduling module 56 can show MPLS paths and bandwidth reservations. The northbound API GUI can also include SSH terminals into routers to show OpenFlow entries. In some examples, connectivity scheduling module 56 may provide a Bandwidth Calendaring Application Hybrid Mode that uses a combination of both Openflow and PCE to program devices in the network. Path provisioning module 68 uses PCEP adapter 80 to program specific bandwidth reservations across backbone via MPLS for the user's video flows. Path provisioning module 68 uses OpenFlow adapter 82 to program a specific forwarding path for the users video flows.

In some examples, path computation engine 64 may determine that an end-to-end path through the overlay network layer is not available, and so PCEP adapter 80 may program a tunnel on a path computed in a base network layer and store a new overlay network link for the tunnel to the topology information for the overlay network layer in the multi-topology traffic engineering database 66. Openflow adapter 82 may program the device profile information for the tunnel to overlay switches in the overlay network layer based on the new overlay network link stored by the PCEP adapter 80 as part of the end-to-end path to service a request. In some examples, PCEP adapter 80 may refer to PCEP library 86. PCEP adapter 80 may, in some examples, refer to resource dependency 90.

In other examples, connectivity scheduling module 56 may provide a Bandwidth Calendaring Application Openflow Mode, in which path provisioning module 68 uses only. OpenFlow adapter 82 to program the network for the specific forwarding path for user's video flows.

In some examples, SDN controller 40 can also provide mobile network control. Mobile core control plane applications such as subscriber session setup, authentication, charging, and signaling execute on general-purpose hardware of the data center intermediated with the mobile core by SDN controller 40. Subscriber devices issue service requests via radio access networks toward the mobile core, which in turn redirects the control plane messages to the SDN controller 40 to encapsulate the control plane messages within a SDN protocol. For each such service request from a subscriber device, a northbound interface associated with mobile services module 63 of SDN controller 35 extracts and processes the control plane messages for subscriber session management. The mobile services adapter 85 in the SDN network layer 44 provides to the mobile core, responsive to the service request and using the SDN protocol, any service responses or other control plane messages that the mobile core forwards to the corresponding subscriber device for subscriber session management and control. In addition, the mobile core control plane applications of the data center may determine and communicate to northbound interfaces of mobile services module 63 mobility-specific information for processing and forwarding subscriber data traffic for the subscriber devices. Mobile services adapter 85 in turn programs the support nodes of the mobile core data plane with the mobility-specific information to configure data plane processing and forwarding for subscriber data traffic associated with a subscriber session for the subscriber device.

For example, assume a mobile subscriber wants to communicate from his mobile handset out of California to a friend's mobile device in Minnesota and there is no network path already set up between the two. The mobile handset will interface with northbound APIs of mobile services 63, which in turn cause mobile services adapter 85 to first set up an MPLS transport path between California and Minnesota. For example, mobile services 63 may involve PCE 64 to determine an appropriate path. Mobile services adapter 85 can call in the mobile-specification application to signal all the mobile protocol parameters so that the mobile phone call can be successfully completed between California and Minnesota. In some cases, mobile services adapter 85 can configure each node in the path with the appropriate parameters, and in other cases mobile services adapter 85 can provide the parameter information to the requesting mobile device or other device to allow that device to perform the signaling and setup based on the parameters. After those parameters are all set up, the user's mobile phone call connects. In this manner, controller 35 can facilitate automatic services creation.

Example mechanisms for an SDN controlled mobile network that can be used by controller 40 are found in U.S. application Ser. No. 13/724,975, filed Dec. 21, 2012, entitled "Software-Defined Mobile Core," the entire content of which is incorporated by reference herein.

Figure 3:
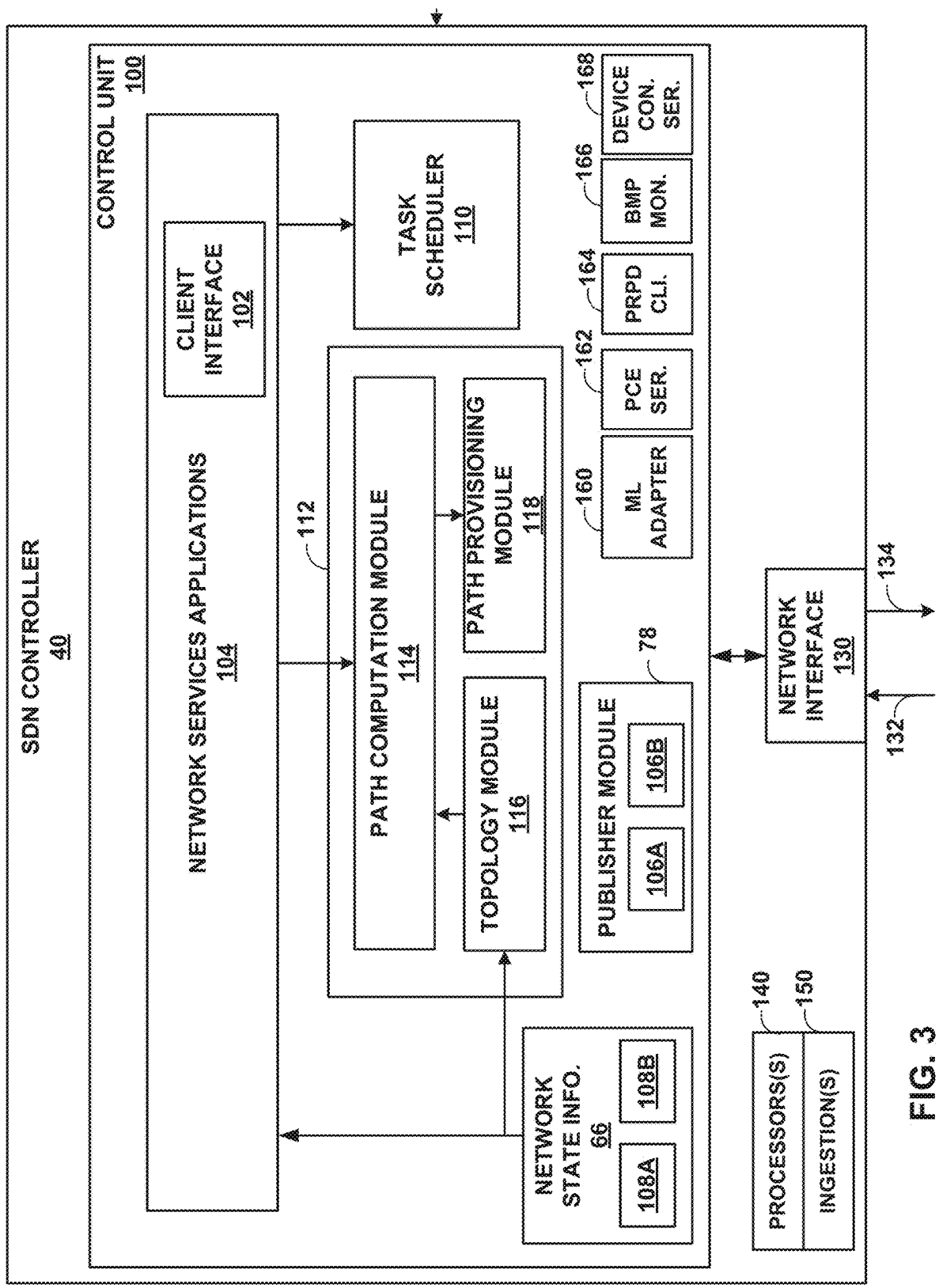
FIG. 3 is a second block diagram illustrating an example controller that operates in accordance with various aspects of the techniques described in this disclosure.

FIG. 3 is a block diagram illustrating an example controller that provides up-to-date network state information to one or more modules and/or one or more applications. Publisher module 78 and, possibly, one or more additional components maintain the up-to-date network state information in data store configured to be a single source of network topology information in support of various functionality, such as connectivity scheduling, to improve operations of client modules or client applications. For example, SDN controller 40 receives updates to a network topology and/or device profiles, publishes new network topology information and/or new device profile information to subscriber clients, and then, computes and implements a network configuration based on the new network topology information and/or new device profile information. For simplicity, FIG. 3 is described in terms of the example of network reconfiguration, but controller 40 may also include other use-case functionality not shown in FIG. 3. Controller 40 may include a server or network controller, for example, and may represent an example instance of controller 35 of FIG. 1.

SDN controller 40 includes control unit 100 coupled to network interface 130 to exchange packets with other network devices by inbound link 132 and outbound link 134. Control unit 100 may include one or more processors 140 that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 100 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

SDN controller 40 includes publisher module 78 to configure a notifications service for clients running micro-services (i.e., subscriber micro-services). Publisher module 78 enables those subscriber micro-services to benefit from having available up-to-date network state information with neither downtime nor costs. Clients to the notification service further benefit from a reduced latency in effectuating changes in network state. The clients to the notification service further benefit from savings in resource costs and other expenditures by offloading the task of acquiring certain data.

Devices in the network of SDN controller 40 may request paths through a network using client interface 102 of network services applications 104. These devices may be subscriber devices, network nodes (e.g., routers, switches, and/or the like), specialized devices, servers, virtual machines/containers, and/or the like. The device itself may be a physical server or a virtual container configured to run one or more kernel-mode modules or one or more user-mode applications; generally, each device is configured to exchange state information with SDN controller 40. In general, a path request includes a requested date/time, a required bandwidth or other constraint, and at least two endpoints. Client interface 102 may be a command line interface (CLI) or graphical user interface (GUI), for instance. Client interface 102 may also, or alternatively, provide an application programming interface (API). Such as a web service. A user uses a client application to invoke client interface 102 to input path request parameters and submit the request to a network service application, such as a bandwidth calendaring application. Client interface 102 receives path requests from clients and pushes the path requests to path request queue, a data structure that stores path requests for computation distribution by path computing engine 112.

Control unit 100 provides an operating environment for various modules and applications. In one example, publisher module 78 includes programmable logic executing on processing circuitry in control unit 40. Publisher module 78 may be implemented using any suitable programming language that produces instructions executable by a suitable platform (e.g., a Java application). Furthermore, while illustrated and described executing in publisher module 78, aspects of publisher module 78 may be delegated to other computing devices.

Control unit 100 provides a mechanism configured to dedicate a network device to operate a notifications service. The dedicated network device may be in a same network as SDN controller 40, and publisher module 78 may run a micro-service to operate the notifications service in a manner that benefits the above subscriber micro-services and/or the network devices. In other examples, the notifications service is instantiated by a different controller and/or in a different network.

In one example, publisher module 78 may run first thread 106A and second thread 106B to operate as an interface that communicates with the notifications service, for example, requesting and receiving new network topology information and new device profile information for storage in one or more databases in network state information 66. Publisher module 78 stores in topology database(s) 108A information describing a recent network topology and in device profile database(s) 108B information further describing the recent network topology, for example, with routing information corresponding to multiple network layers and information describing paths through the network. In one example, second thread 106B may be configured to receive from the notifications service event notifications indicating updates to network state information 66 and first thread 106A may be configured to read the new network topology information and/or the new device profile information for updating topology database(s) 108A and/or device profile database(s) 108B. As described herein, the notifications service maintains global network state information in one or more databases (e.g., remote databases), including current network topology information and current device profile information for one or more network layers of a network (e.g., a mobile-core network). In some instances, controller 40 maintains copies of the one or more databases as topology database(s) 108A and/or device profile database(s) 108B.

Publisher module 78 and/or the notification service may, from a number of data sources, receive topology information for a base network, an overlay network, a packet-defined network such as a cloud-based data center or a mobile core network, a radio access network, and/or the like. Publisher module 78, the notification service, and/or the topology sever may in some instances be passive listeners that neither forwards nor originates routing protocol advertisements. Publisher module 78 and/or the notification service may in some instances each receive a digest of topology information collected by the topology service, rather than executing a routing protocol to receive routing protocol advertisements directly. Publisher module 78 may store the digest of topology information (e.g., with TE, information) in a computer-readable storage medium of control unit 100 for use in path computation.

Similar to controller 40 of FIG. 1, SDN controller 40 also comprises one or more modules (e.g., of a mobile core network) configured to compute new network configurations in response to updates to the network topology and/or device profiles. SDN controller 40 also comprises a topology manager (of which one example is illustrated in FIG. 3 as topology module 116) to aggregate over time (e.g., a number of iterations) network topology information from one or more external data sources, such as a topology service (e.g., running on the above topology server), SDN controller 40 also comprises and one or more (mobile core network) applications configured to aggregate over time (e.g., a number of iterations) device profile information from one or more second external data sources, such as a device service (e.g., running on a base station of a radio access network, on the above overlay controller, or on a specialized network device). To implement a new network configuration after an update to the network topology and/or the device profile, SDN controller 40 uses network device protocol interfaces to program the new network topology information and/or the new device profile information into (e.g., control units of) the network devices.

As mentioned herein, the topology manager is a network entity configured to maintain network topology information for modules in a network controller and other network devices. SDN controller 40 may include topology module 116 to run (e.g., a component of) the topology manager for the network. Topology module 116 may receive input datasets from network resources that include network nodes and subscriber devices, resolve a current/recent network topology, and then, generate datasets of network topology information for use by other modules in performing some functionality. A dataset may refer to structured data in accordance with a pre-determined format, and a dataset of network topology information may refer to an arrangement of attribute data for describing/establishing some aspect (e.g., parameter) of the network topology. A module in SDN controller 40 may request a set of specific attributes in a particular format that is known and furthermore, in compliance with any necessary protocol or mechanism for completing the request. Topology module 116 may output a compatible dataset for communication (E.g., IPC) to the requesting module and/or may store that dataset in network state information 66.

Publisher module 78, in turn, may publish the above dataset (or a modified version) in accordance with a publisher-subscriber model. For example, publisher module 78 may configure an external network device to operate a notifications service, send the compatible dataset to an external data store for storage, and using one or more of the set of specific attributes, establish a subscription for events notifications corresponding to updates to the dataset or, in general, to updates to the network topology information being represented by the specific attributes. The requesting module' subscription directs the notifications service and publisher module 78 to provide (e.g., as an input feed) any new information corresponding to the published dataset. Publisher module 78 may be configured with a dynamic operation mode and return one or more datasets in response to receiving a message indicating the requesting module's request. In other examples, publisher module 78 runs the topology manager (e.g., instead of or as a replacement for topology module 116) in addition to publishing new network topology information corresponding to recent changes in the network topology and other updates to the global network state. It also is possible for the requesting module to access the new network topology information without any module operating the topology manager.

Publisher module 78 is configured to publish datasets of network topology information by sending such datasets to the notifications service for storage in the external data store. Publisher module 78 may configure the external data store to maintain up-to-date network topology information for other modules of controller 40, including core modules/plugins (like traffic engineering database, path computation engine) that enable applications, such as core applications and user-oriented applications. To receive new information for a current or most recent network topology, the above modules/plug-ins/applications leverage publisher module 78 and the external data source as a single source of truth for up-to-date global network state information.

SDN controller 40 further includes one or multiple processor(s) 140 and one or multiple ingestions 150 where processor(s) 140 and ingestion(s) 150 are separate hardware units (e.g., of special-purpose hardware), both including computer memory, logic such as programmable logic, and circuitry or circuitries and each performing different sets of operations for complimentary functionality. In general, processor 140 refers to an execution element comprising processing hardware (e.g., processing circuitry) and ingestion 150 refers to a data ingestion pipeline; in operation, ingestion 150 provides instructions and other data for processor 140 to use in moving streaming data and batched data from multiple sources into a centralized data store, such as in network state information 66. In one example, a pair of ingestion(s) 150 and processor(s) 140, as component hardware units, may be combined into a network entity, and SDN controller 40 may instrument the entity for a networking protocol, such as for NETCONF functionality. SDN controller 40 may configure the above pairs of ingestion 150 and processor 140 to program network devices in accordance with computed network configurations. Other pairs SDN controller 40 may include hardware/software components for operating as client modules/applications with subscriptions for changes in published network state information. In one example, ML adapter 160 is a machine learning (ML) architecture adapter configured to bring online a host device to become part of the ML architecture (e.g., an assisted learning framework). ML adapter 160 may consume up-to-date network topology information and/or device profile information to train a machine learning model and/or make a prediction using the model. External/remote devices may communicate such data to ML adapter 160 using standardized REST protocol operations.

In another example, PCE server 162 is a dedicated client service that operates a PCE server generally configured to and manage network topology and tunnel attributes for all PCE clients, which facilitates network management, PCE server 162 may leverage Path Computation Element Protocol (PCEP) for communications between a PCC and a PCE, or between two PCEs, in compliance with a current network configuration. PCE server 162 may provide service where other client modules/applications running on external nodes may employ computational resources for path computations.

As yet another example, PRPD CLI 164 is a client in accordance with common programmable routing protocol (PRPD). In general, PRPD CLI 164 is daemon configured with public APIs to program routing and other network devices in a topology, implement changes to the topology, and grant permission for users to directly access the APIs to customize the topology, which may affect network behavior. If PRPD CLI 64 is enabled. SDN controller 40 may push network topology information and/or device profile information to network devices using PRPD client 64 at the local ASBR. PRPD prescribes at least one format for arranging the network topology information. PRPD may prescribe a mapping format for each tuple in the dataset and, in one example, publisher module 78 generate tuples for that dataset where each tuple includes a mapping between ingress device and egress device. An administrator, via a command line interface (CLI), may input data to change the network topology or prescribe a data format for describing the network topology. These changes are propagated to SDN controller 40, published by publisher module 78, and then, ultimately distributed to other subscriber client modules/applications.

In a fourth example, BMP monitor 166 is a BGP Monitoring Protocol (BMP), which may be used to monitor BGP peering sessions. BMP is intended to provide a convenient interface for obtaining route views and other network state information. Operability of BMP monitor 166 may depend on up-to-date network state information, otherwise, route views may be invalid.

In a fifth example, device connection service 168 is a hardware/software component for a transport mechanism connecting SDN controller 40 to an external network device. In particular, device connection service 168 may create a TCP socket with an address of the external network device. In one example, publisher 78 may configure the external network device to operate the notifications service described herein and to store a remote copy of network state information 66. To exchange network state information with that network device, publisher module 78 may use the transport mechanism configured with the above TCP socket.

Publisher module 78 or another module/application in SDN controller 40 may invoke network protocol functionality, and in one example, processors(s) 140 and/or ingestion(s) 150 may execute NETCONF operations configured to install, modify/manipulate, and/or delete the configuration of network devices. A network configuration generally refers to a given network's architecture, including data identifying different network resources that controller 40 provisioned in the network and further identifying virtual network resources that controller 40 provisioned for a specific subset of network devices. For a plurality of network devices, an example network configuration specifies parameters of a base network layer and/or parameters of an overlay network for the subset of network devices, such as an Autonomous System set up as a VPN. Some network resources are provisioned to satisfy a requirement or a need. Installing the network configuration may include provisioning paths between network devices including tunnels between subnetworks (e.g., virtual networks).

If a mobile service provider network includes SDN controller 40, a corresponding network configuration generally refers to the network's cellular network architecture, including data defining cellular radio access network resources and further defining mobile services to provide the subscriber devices. An example network configuration specifies parameters for a collection of cells that define the radio access network and parameters for one or more cells that each includes at least one base station capable of transmitting and relaying signals to subscribers' wireless devices (e.g., subscriber devices 18B). Example configuration parameters for a "cell" generally define a distinct area of the mobile service provider network that utilizes a particular frequency or range of frequencies for transmission of data. The network's cellular network architecture most likely complies with a published networking standard or an otherwise commonly known architecture; as an example, the NETCONF protocol, as mentioned above, is defined by the IETF and NETCONF operations are realized on top of a Remote Procedure Call (RPC) layer using an XML encoding and provide a basic set of operations to edit and query configuration on a network device.

A timeliness in which the network topology information and/or device profile information may be distributed to the subscriber micro-service depends on one or more factors and improving that timeliness may significantly improve performance of controller 40. Examples of the publisher module 78 described herein ensure the global network state information provided to the core modules is up-to-date, for example, by way of various techniques configured to increase a rate at which updates to the global state information are received and then, incorporated into the data source as new global state information and/or reduce a latency between reception and incorporation. Some techniques employ batch processing for the updates to the global state information such that a number of updates are processed (together) in one iteration (e.g., proactively) instead of one at a time upon arrival (e.g., reactively). Proactive batch processing allows for a number of enhancements, for example, such that the controller 40 processes only a subset of the updates, disregarding one or more other updates for a number of reasons.

Control unit 100 provides an operating environment for network services applications 104, path computation element 112, and edge authorization provisioning module. In one example, these modules may be implemented as one or more processes executing on one or more virtual machines of one or more servers. That is, while generally illustrated and described as executing on a single controller 40, aspects of these modules may be delegated to other computing devices.

Network services applications 104 represent one or more processes that provide services to clients of a service provider network that includes controller 40 to manage connectivity in the aggregation domain (alternatively referred to as the "path computation domain") according to techniques of this disclosure. Network services applications 104 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 104 require services provided by path computation element 112, such as node management, session management, and policy enforcement. Each of network services applications 104 may include client interface 102 by which one or more client applications request services. Client interface 102 may represent a command line interface (CLI) or graphical user interface (GUI), for instance. Client 102 may also, or alternatively, provide an application programming interface (API) such as a web service to client applications.

Network services applications 104 utilize task schedule 110 to schedule tasks by client applications and by SDN modules or applications. Network services applications 104 issue path requests to path computation element 112 to request paths in a path computation domain controlled by controller 40. For example, a path request includes a required bandwidth or other constraint and two endpoints representing an access node and an edge node that communicate over the path computation domain managed by controller 40. Path requests may further specify time/date during which paths must be operational and CoS parameters (for instance, bandwidth required per class for certain paths).

Path computation element 112 accepts path requests from network services applications 104 to establish paths between the endpoints over the path computation domain. Paths may be requested for different times and dates and with disparate bandwidth requirements. Path computation element 112 reconciling path requests from network services applications 104 to multiplex requested paths onto the path computation domain based on requested path parameters and anticipated network resource availability.

To intelligently compute and establish paths through the path computation domain, path computation element 112 includes topology module 116 to receive information describing available resources of the path computation domain, including access, aggregation, and edge nodes, interfaces thereof, and interconnecting communication links. In some examples, topology module 116 is a client of the notifications service and receives event notifications under a subscription for specific datasets of network topology information. When those datasets change in some manner, the notifications service may distribute an event notifications for each change and, in some examples, that distribution may be through direct communications to topology module 116 or through indirect communications to topology module 116 by way of publisher module 78. In other examples, topology module 116 accesses the above information in network state information 66.

Path computation module 114 of path computation element 112 computes requested paths through the path computation domain. In general, paths are unidirectional. Upon computing paths, path computation module 114 schedules the paths for provisioning by path provisioning module 118. A computed path includes path information usable by path provisioning module 118 to establish the path in the network. Provisioning a path may require path validation prior to committing the path to provide for packet transport. Path computation module 114 may correspond to path computation engine 64 (FIG. 2) and path provisioning module 118 may correspond to path provisioning module 68.

Figure 4:
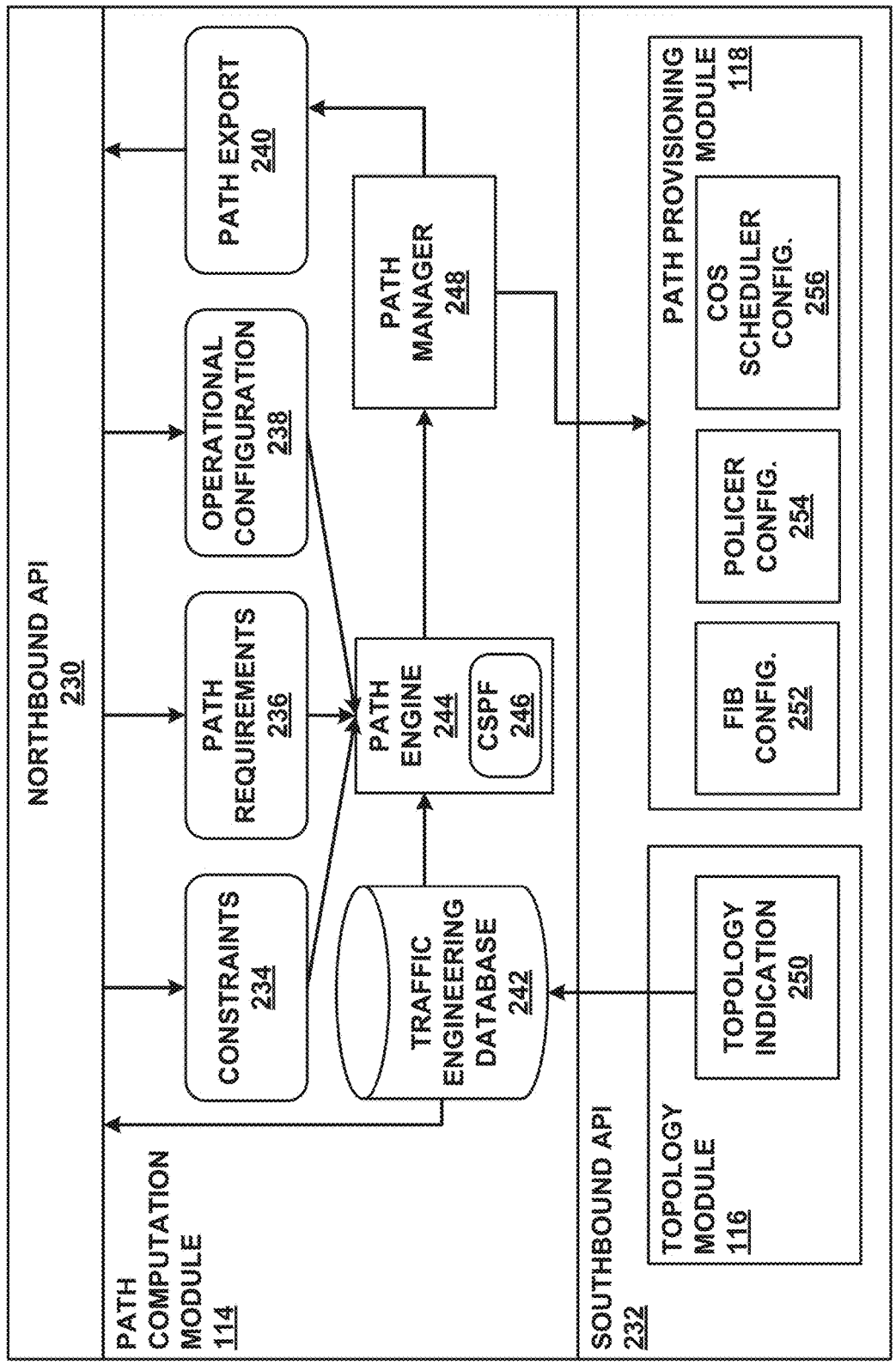
FIG. 4 is a block diagram illustrating an example path computation element that operates in accordance with various aspects of the techniques described in this disclosure.

FIG. 4 is a block diagram illustrating an example implementation of path computation element 112 of controller 40 of FIG. 3. In this example, path computation element 112 includes northbound and southbound interfaces in the form of northbound application programming interface (API) 230 and southbound API (232). Northbound API 230 includes methods and/or accessible data structures by which network services applications 104 may configure and request path computation and query established paths within the path computation domain. Southbound API 232 includes methods and/or accessible data structures by which path computation element 112 receives topology information for the path computation domain and establishes paths by accessing and programming data planes of aggregation nodes and/or access nodes within the path computation domain.

Path computation module 114 includes data structures to store path information for computing and establishing requested paths. These data structures include constraints 234, path requirements 236, operational configuration 238, and path export 240. Network services applications 104 may invoke northbound API 230 to install/query data from these data structures. Constraints 234 represent a data structure that describes external constraints upon path computation. Constraints 234 allow network services applications 104 to, e.g., modify link attributes before path computation module 114 computes a set of paths. For examples, Radio Frequency (RF) modules (not shown) may edit links to indicate that resources are shared between a group and resources must be allocated accordingly.

Network services applications 104 may modify attributes of a link to effect resulting traffic engineering computations. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. The link edit message may be sent by the PCE 214.

Operational configuration 238 represents a data structure that provides configuration information to path computation element 214 to configure the path computation algorithm with respect to, for example, class of service (CoS) descriptors and detour behaviors. Operational configuration 238 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 240 represents an interface that stores path descriptors for all paths currently committed or established in the path computation domain. In response to queries received via northbound API 230, path export 240 returns one or more path descriptors. Queries received may request paths between any two edge and access nodes terminating the path(s). In some examples, path descriptors may be used by network services applications 104 to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour) and a bandwidth for each CoS value. In response to receiving the path descriptor, the receiving device may use RSVP-TE to signal an MPLS LSP from the ingress to the egress of the path.

Path requirements 236 represent an interface that receives path requests for paths to be computed by path computation module 236 and provides these path requests (Including path requirements) to path engine 244 for computation. Path requirements 236 may be received, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 116 includes topology indication module 250 to handle topology discovery and, where needed, to maintain control channels between path computation element 112 and nodes of the path computation domain. Topology indication module 250 may include an interface to describe received topologies to path computation module 114. Topology module 116 may determine a current/recent network topology using network state information 66.

Topology indication module 250 may use a topology discovery protocol to describe the path computation domain topology to path computation module 114. In one example, using a cloud control protocol mechanism for topology discovery, topology indication module 250 may receive a list of node neighbors, with each neighbor including a node identifier, local port index, and remote port index, as well as a list of link attributes each specifying a port index, bandwidth, expected time to transmit, shared link group, and fate shared group, for instance. With the benefit of the present disclosure, the above example may be offloaded to publisher module 78 of FIG. 2 or the notifications service.

Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 250 executes BGP-TE to receive advertised TE information for inter-autonomous system and other out-of-network links.

Traffic engineering database (TED) 242 stores topology information, received by topology indication module 250, for a network that constitutes a path computation domain for controller 40 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some instances, an operator may configure traffic engineering or other topology information within MT TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If there are no TE constraints, path engine 244 may revert to SPF. If a satisfactory computed path for the requested path exists, path engine 244 provides a path descriptor for the computed path to path manager 248 to establish the path using path provisioning module 118. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 118, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure).

FIB configuration module 252 may add, change (i.e., implicit add), or delete forwarding table entries in accordance with information received from path computation module 114. A FIB configuration message from path computation module 114 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 114 to request a policer be installed on a particular aggregation node or access node for a particular LSP ingress. As noted above, the FIBs for aggregation nodes or access nodes include policers at LSP ingress. Policer configuration module 254 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 114 to request configuration of CoS scheduler on the aggregation nodes or access nodes. CoS scheduler configuration module 256 may receive the CoS scheduler configuration information. A scheduling configuration request message may specify an event type (change); a node identifier; a port identity value (port index); and configuration information specifying bandwidth, queue depth, and scheduling discipline, for instance.

Figure 5:
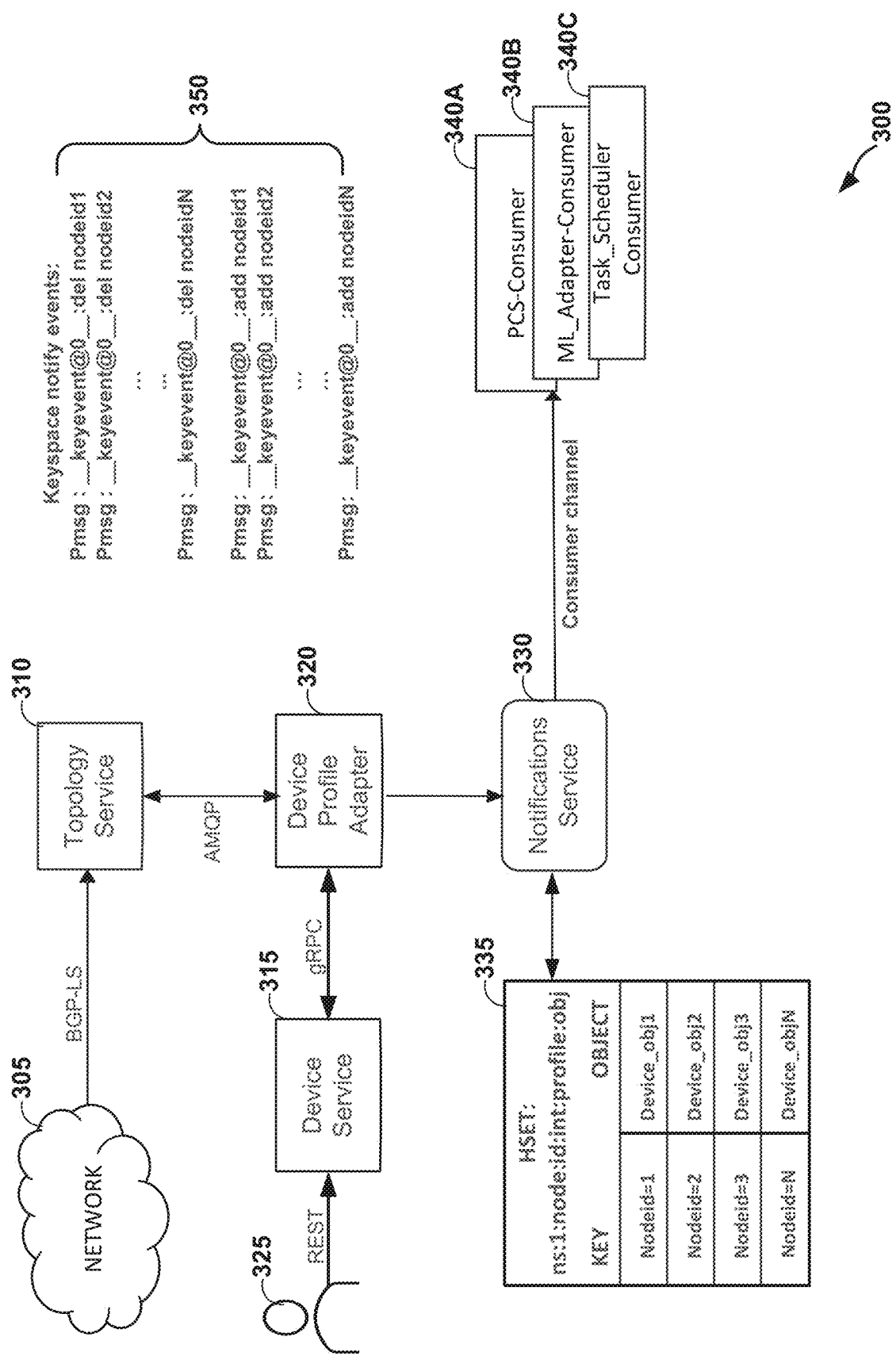
FIG. 5 is a conceptual diagram illustrating an example system in accordance with various aspects of the techniques described in this disclosure.

FIG. 5 is a conceptual diagram illustrating an example system in accordance with various aspects of the techniques described in this disclosure. System 300 and various system components of FIG. 5 represent the example system and provide a publisher-subscriber model for network state updates where publisher micro-services maintain up-to-date network state information for subscriber micro-services.

The example system of FIG. 5 follow a process flow for the above publisher-subscriber model, and in general, the process flow involves an example subscriber micro-service that desires up-to-date information from certain datasets of network state information, and to facilitate the example subscriber micro-service, the publisher micro-service establishes a subscription using one or more attributes of desired datasets such that updates or changes (e.g., events) to the desired datasets cause (e.g., trigger) event notifications to be communicated to the example subscriber micro-service. Event notifications may identify new information and/or modified/deleted information in the desired datasets resulting from the updates or changes and based on the event notifications, the example subscriber micro-service may retrieve the new information form a local data store (E.g., network state information 66 of FIG. 2). Other examples of event notifications may store the new information and/or identify any modified/deleted information. In some examples, the publisher micro-service may communicate the event notifications as a sequence of messages (e.g., in an input feed of continuous events), and the example subscriber micro-service may process the event notifications in real-time or otherwise (e.g., batched).

The above-mentioned subscription may define the desire datasets (e.g., with the attributes) and include other parameters controlling the distribution of event notifications. Example parameters of the publisher-subscriber model include user credentials for accessing plaintext information in the desired datasets, cryptographic information for securing the desired datasets with a protection mechanism/overcoming a protection mechanism for securing the datasets, a configurable expiration time period for the subscription, and any other parameter further defining the desired datasets. The subscription may further specify an operating mode (e.g., proactive/reactive event notifications). Another parameter may be a copy of a configurable time period used for the batch processing by the example subscriber micro-service.

FIG. 5 depicts system 300 as an example implementation of the above publisher-subscriber model and further depicts the above flow between publisher micro-service(s) and subscriber micro-service(s). As illustrated in FIG. 5, notifications service 330 represents an example publisher micro-service, and client consumers 340A-340C represent example subscriber micro-services. The network controller (e.g., a publisher module such as publisher module 78 of SDN controller 40 of FIG. 2) properly configured the example publisher micro-service, notifications service 330, to distribute event notifications in accordance with a subscription established for each example subscriber micro-service, client consumer 340.

The present disclosure describes a number of example implementations for notifications service 330 and, according to one example, (e.g., the above-mentioned publisher module of) the network controller configures notifications service 330 as a REDIS service. In general, REDIS refers to technology including an in-memory data structure store, used as a distributed, in-memory key-value database, cache and message broker. By implementing a REDIS database, notifications service 330 may define subscriptions for distributing, amongst a plurality of subscriber micro-services, updates to a portion of the global network state information as described herein. Notifications service 330 may define a hash map with attributes (e.g., a node identifier-device object identifier pair) for identifying datasets for the subscribed portion of the global network state information.

In some examples, the above-mentioned publisher module may include a REDIS client database module that is configured to run a REDIS notifications micro-service on a same host as the network controller or on a different host. In these examples, the REDIS notifications micro-service may program other services/event listeners (e.g., device service and topology service) to feed it any update to global network state information having the above attributes, for example, the node identifier-device object identifier pair. For each of the one or more subscriber micro-services configured to process these updates, the REDIS notifications micro-service (e.g., as instantiated by the above-mentioned publisher module) may instantiate a respective first thread to wait for a configurable time period while a respective second thread receives one or more event notifications from the REDIS notification micro-service, and when the configurable time period elapses, the first thread reads at least one update to the portion of the global network state information in the one or more received event notifications. In some examples, each subscriber micro-service is configured with a respective pair of threads such that a first subscriber micro-service is configured with the first and second thread and a second subscriber micro-service is configured with the third and fourth threads. Furthermore, the first subscriber micro-service and the second subscriber micro-service may be configured with a first and second configurable time periods with different or same amounts of time set for each time period. In some examples, the first subscriber micro-service and the second subscriber micro-service may be configured with respective sleep time periods based on one or more parameters (e.g., statistics), such as a rate at which updates/event notifications are distributed (or feed) into a particular subscriber micro-service for processing. Some parameters specify differences (e.g., in data transfer rates) between two or more micro-services.

The techniques of the present disclosure are applicable to most (if not all) network types, both public and private. Examples of other network types include local area networks (LANs), virtual local area networks (VLANs), virtual private networks (VPNs), and the like. In some examples, network 305 may be coupled to one or more additional private or public networks, e.g., the Internet. In other examples, network 305 may comprise the Internet or another public network. In some cases, network 305 may comprise a multi-protocol label switching (MPLS) network. Network 305 is composed of a number of customer sites where each of the customer sites include a local area network (LAN) or a wide area network (WAN) that comprises a plurality of subscriber devices, such as desktop computers, laptops, workstations, PDAs, wireless devices, network-ready appliances, file servers, print servers or other devices. In some cases, the customer sites may be configured to support multicast traffic, such as Internet Protocol Television (IPTV), desktop conferences, corporate broadcasts, music and video web casts, and other forms of multimedia content. One or more of the customer sites include a radio access network (RAN) where mobile devices have a topology based on a known cellular network architecture; in some examples, the RAN is coupled to a packet-defined network, such as a mobile core network or a cloud-based data center.

Network 305 of system 300 refers to a computer network, an example of which includes edge routers (e.g., provider edge (PE) routers) to provide network services and manage traffic between source devices and receiver devices. At least some of the source devices and receiver devices are associated with (e.g., housed within or connected to) customer sites. Each of PE routers couples to one or more customer sites via customer edge (CE) routers. In some examples, network 305 is referred to as a "core" network, and interfaces of PE routers that couple to another PE router may be referred to as "core-facing" interfaces. In these examples, network 305 may represent a packet-defined network, such as a mobile core network of a mobile service provider network.

Each router in network 305 receives/transmits packets as a destination/source or operates as an intermediary exchanging packets between network devices. Each packet reception/transmission involves a router directing the packets along a path toward an appropriate destination. To enable such packet receptions/transmissions, PE router configures its routing and forwarding components with information regarding computer network, such as information describing other routers as well as paths between PE router and the other routers. Examples of such information include tables storing mappings between identifiers (e.g., names) and addresses (e.g., Media Access Control (MAC) addresses) for the other routers and the paths, PE router processes such information to determine, for instance, which routers are neighbors/peers (e.g., BGP peers) and which paths (e.g., label switched paths (LSPs)) include PE router and therefore, require computing time/resources from PE router. PE router runs communication sessions for a number of protocols to generate and then, propagate such information. As described herein, some example protocols include Border Gateway Protocol (BGP) and Resource Reservation Protocol (RSVP).

As devices (e.g., network devices such as switches and routers and subscriber devices such as wireless user devices) move between network hierarchy levels (e.g., sub-networks such as virtual networks, cells, and/or the like) of network 305, topology service 310 receives a considerable number of individual updates (e.g., real-time network topology updates and recent device profile updates) via BGP-LS and/or NTAD/BMP protocols. As described herein for FIG. 2 and FIG. 3, a SDN controller may run a topology module as a component of topology service 310 where another component, a topology server, runs on an external device to collect datasets of topology information from a variety of sources. Topology service 310 configures the topology server to identify and record updates to any of the collected datasets and then, to forward the updates to the publisher microservices. In one example, the topology server communicates the updates (e.g., including updated topology information) to the device running notifications service 330.

In one example, topology service 310 receives traffic engineering (TE) information as example topology information. Topology service 310 may, for example, execute intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the domain. In some instances, topology service 310 executes Border Gateway Protocol (BGP) to receive advertised TE information for inter-AS (inter-Autonomous System) and other out-of-network links.

Notifications service 330 may in some instances receive a digest of topology information collected by topology service 310, rather than executing a routing protocol to receive routing protocol advertisements directly. Notifications service 330 stores base network topology information with TE information in one or more databases 335, which ultimately copied to storage space in a computer-readable storage medium of control unit 100 for use in path computation.

Topology service 310 may receive, in peering sessions, topology information for the base network layer originated or forwarded by routing protocol speakers of multi-topology network 305. The received topology information describes the topology of the routers in the base network layer and reachability of network address prefixes by any of the routers. Peering sessions may comprise Transmission Control Protocol (TCP) sessions between topology service 310 and the routers. In some instances, topology service 310 may establish a single peering session with a route reflector (not shown) that "reflects" topology information to topology service 310 that is received by the route reflector from the routers.

The peering sessions may also, or alternatively, include interior gateway protocol (IGP) sessions between topology service 310 and routers. Peering sessions may represent, for example, an OSPF or IS-IS neighbor relationship (or "adjacency") or may simply represent movement of current routing information from routers to topology service 310. In some instances, peering sessions include traffic engineering extensions (e.g., OSPF-TE or IS-IS-TE) and routers provide traffic engineering information to topology service 310.

Similar to the topology server of topology service 310 and in a same network, an overlay controller may be configured distribute messages describing overlay network links connecting overlay switches. In general, overlay network links are not advertised by network switches (e.g., routers) of the base network for the overlay network and thus, may not be described by topology information received by topology service 310. Overlay network topology information may augment base network topology information with overlay network topology links by providing overlay network topology information to notifications service 330, which stores the overlay network topology information to global network state information database(s) 335. Notifications service 330 may receive topology information for multiple different overlay networks, including VPNs and/or OpenFlow networks. For different overlay networks, device service 315 may implement different instances of an overlay controller interface that communicate with network switches of the overlay network or with topology service 310, for example, to receive overlay network topology information for respective overlay networks.

Device service 315 is a computing service deployed, by the network controller, to a network device (e.g., a server or a container) configured to receive user-triggered device profile updates from customer sites 325 via REST and similarly, make these updates available for client subscription and then, subscriber micro-service consumption. Device service 315 may augment the above topology information with state information of specific devices of network 305. Users of individual devices or a network administrator may configure device service 315 to receive various device state information to populate a device profile for each device in network 305. Examples of the device state information include username, login credentials, SNMP version, NETFLOW disabled/enabled, and other parameters corresponding to application provisioning, PFM, fault management, performance management, configuration management, and/or the like. Device service 315 may store each device's network topology and device profile in a centralized database in database(s) 335.

Device service 315 and/or topology service 310 submit input data (in some form) to device profile adapter 320; and, in turn, device profile adapter 320 uses notifications service 330 to publish the input data (or a portion thereof), for example, by way of distributing event notifications for each update to network state information. As an example, device profile adapter 20 may receive separate data feeds from device service 315 and topology service 310, each input data feed transporting a sequence of events indicating (e.g., continuous) changes to datasets of network state information. The input data, in general, describes each (recent) update to a specific dataset corresponding to some aspect of a network topology and/or a device profile. Such an update may refer to new information or deleted/modified information in any one dataset. Whenever there is a new addition, deletion, or other modification to network 305, or if a device user is not synced and initiates a restart/reset (which may change the network topology), device service 315 may update the above centralized database (e.g., a hash map) and distribute the appropriate event notifications to subscribers. The present disclosure includes techniques for handling a considerable number of these notifications, which may prevent the network controller from being overwhelmed (e.g., with latencies and/or errors).

In some examples, notifications service 330 has multiple operating modes and one example mode directs notifications service 330 to run a publisher micro-service configured to process (e.g., in real-time) a stream of (continuous) updates to the datasets of network state information. Another operating mode directs notifications service 330 to execute batch processing techniques on the updates to the (global) network state information; to illustrate one example technique for this operating mode, notifications service 330 may configure a time interval/time window for controlling when event notifications are processed for updates. In one example, notifications service 330 receives one or more updates and refrains from reading any new information or forwarding each update to a subscriber micro-service except for a time period defined by the above time interval/time window. By doing so, notifications service 330 reduces latencies associated with propagating these updates, for example, a latency resulting from an error such as a delay caused by processing invalid or slate updates to a deleted or corrupted dataset.

Device service 315 and topology service 310 may employ gPRC and AMZQ (or similar protocols), respectively, to submit the updates to notifications service 330 via device profile adapter 320. By enabling the publication of these updates, consumers 340A-C may regulate the propagation of these updates to avoid flooding while preventing the data from going stale. As an example, notifications service 330 may distribute a copy of database 335 while updating that copy with change notifications received via device profile adapter 320. An example client consumer 340 may be a dependent micro service that retrieves, from notifications service 330, the network topology updates and device profile updates using a publish/subscribe model as a single source of truth.

While notifications service 330 may be configured to handle more or less subscribers/clients than consumers 340 as illustrated in FIG. 5, each of consumers 340A-C represents an example network micro-service in the network controller) for which notifications service 330 has configured a subscription to notify in event of (e.g., in response to) an update/change in any dataset storing information corresponding an aspect of network topology and/or a device state. Consumers 340A, 340B, and 340C are depicted in FIG. 5 as a as Path Computation Service (PCS), ML_Adapter, and Task_Scheduler, respectively.

Notifications service 330 provides consumers 340 with information from database(s) 335, including new information describing available resources at a single layer or multiple layers of the network to receive; in turn, consumers 340 use that information to compute and schedule paths through the network. In examples where network 305 includes a mobile-core network layer and/or a radio access network layer, notifications service 330 provides new topology information describing (mobile or radio) resources one or more of these layers.

In some examples, a first thread and/or a second thread may create a consumer channel with notification service 330 as an interface to receive network topology information. Notification service 330 may include a routing protocol daemon that executes a routing protocol to receive/forward routing protocol advertisements, such as Open Shortest Path First (OSPF) or Intermediate System-to-Intermediate System (IS-IS) link state advertisements (LSAs) or BGP UPDATE messages. In other examples, topology service 310 and/or device profile adapter 320 execute the routing protocol, and notification service 330 may operate as a passive listener that neither forwards nor originates routing protocol advertisements. Notifications service 330 may update database(s) 335 with updates to network topology information and/or network device profile information and then, send those updates to consumers 340.

Notifications service 330 maintains network topology database 335 to be a centralized database from which update notifications are distributed to subscribers including consumers 340. When there is a change in network topology or resynchronization of a device profile (e.g., triggered by a device user such as user 320), notifications service 330 modifies network topology database 335. As one example, notifications service 330 deletes and rebuilds the device profile, resulting in near-continuous change notifications distributed to a substantial number of consumer clients. In case of a large network 305 (e.g., a network having more than 10K clients), each subscriber device in network 305 is required to handle 10 k notifications which may result in performance issues and data inconsistency. These devices may implement a mechanism, such as the example process illustrated in FIG. 6, for handling update notifications at any rate.

Both topology service 310 and device service 315 may be micro-services for the controller and configured to publish the updates to network topology and/or device profile data. In a publish/subscribe model, one or more (publisher) micro-services may push individual updates to a centralized database (e.g., in a Redis® Database) and index each update according to a hash-set keyspace "ns:1:node:id:int:profile:obj" with a key-value pair defined according to node identifier-device-object identifier pair format. FIG. 5 illustrates network topology database 335 as an example of the centralized database. Consumers 340 may be classified as dependent micro-services and automatically subscribe to keyspace event notifications on "_keyspace@0_:ns:1:node:id:int:profile:obj." Each consumer 340 may implement a technique, as described herein, to listen for (continuous) add/remove/update events and increment the global variable event-count for each received event notification. Consumer 340 may not process any events until a sufficient number have arrived and/or a sleep period has elapsed. In this manner, consumer 340 throttles the event notifications and by doing so, prevents flooding where consumer 340 is inundated with topology updates. For the sleep period, a timer thread with a configurable time window (e.g., two seconds) associated with the consumer 340 may be executed to check the event-count variable at intervals determined by that time window and if the event-count variable exceeds 0, consumer 340 may read updated device data from the centralized Redis database and then, reset the event-count variable to zero.

Figure 6:
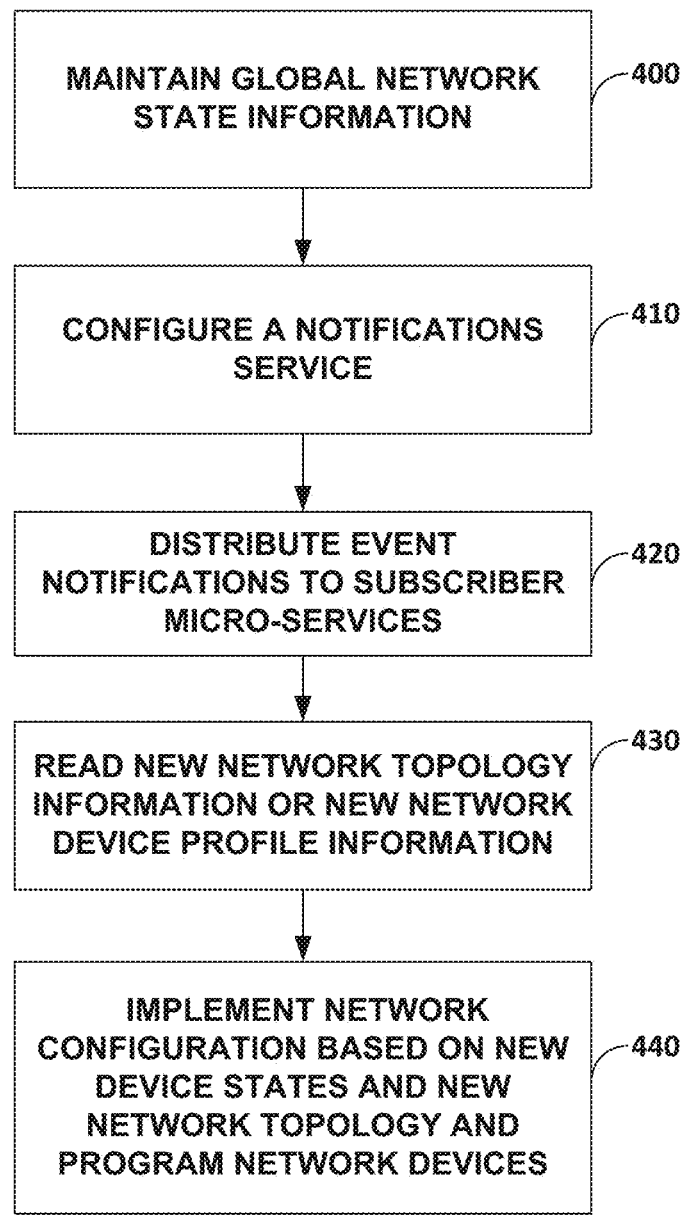
FIG. 6 is a flowchart illustrating an example method in accordance with various aspects of the techniques described in this disclosure.

FIG. 6 is a flowchart illustrating example process in accordance with various aspects of the techniques described in this disclosure. A network controller as described herein may include a number of hardware and/or software components that when executed by processing circuitry and an operating system, run micro-services and services (e.g., application services) that use network state updates to support the network functions (e.g., network services). As described herein, another micro-service, a publisher micro-service, configures a notifications service to run in the network of the controller and to publish these updates as events (e.g., keyspace events) where each event is a reference to datasets of (global) network state information (400).

As illustrated by and described herein for FIGS. 1-5, there are a number of sources of network topology information and device profile information and publisher module 78 maintains network state information 66 as a local store for at least some of the global network state information available to the network controller. Publisher module 78 runs the publisher micro-service to ensure that any subscriber client can make advantageous use of state information. In service provider network 20 of FIG. 1, any consumer of state information may establish a subscription for datasets of state information and become a client of the notification service. When these micro-services subscribe, via the network controller, to the notifications service to receive these updates, these micro-services may be referred to herein as consumer, clients, subscribers, subscriber clients, or any combination thereof.

A module, application, or other component of controller, such as SDN controller 40, may initiate the example process by invoking publisher module, such as publisher module 78. Publisher module 78 may configure the notifications service to run anywhere in the network. Publisher module 78 sends updates to the global network state information maintained in network state information 66 (410). There are a number of mechanisms publisher module 78 may employ for identifying these updates and a number of examples are described herein.

FIGS. 1-5 illustrate examples where some source provides these updates to controller, such as SDN controller 40 of FIG. 2. Publisher module 78 receives these updates to the global network state information in some form and configures the notifications service to maintain up-to-date global network state information while monitoring distribution of event notifications if any subscriber client desires new network topology information and/or new device profile information, for instance. As described, for instance, in FIG. 5, a subscription includes attribute values corresponding to subscribed datasets and any matching dataset is to be communicated to the subscriber client in either the event notification itself or in another message.

Publisher module 78, if desired by the network and service provider, may feed (e.g., as a stream) input data to modules/applications running in SDN controller 40. Publisher module 78 may generate a first thread and a second thread to operate as an interface to the notifications service, for requesting and receiving notifications for certain events corresponding to specific updates to the above global network state information.

Publisher module 78 configures the notification service to be a computing service to any other module/application running a micro-service/service on the service provider network. The notification service may run on SDN controller 40 itself, a dedicated network device in the network distinct from SDN controller 40, and/or a remote device in a different network. In some examples, publisher module 78 and another module/application in SDN controller 40, by performing following operations, performs batch processing of event notifications to reduce latencies in propagating global network state information.

Publisher module 78 may establish a sleep timer for the first thread. Publisher module 78 may establish a configurable time period for the sleep timer such that the first thread waits sleeps) during the configurable time period while the second thread receives event notifications. When the time period elapses, the first thread reads new network topology information and/or new device profile information (430) from the notifications service or a local data store, such as network state information 66. Publisher module 78 may provide the example subscriber client (e.g., micro-service) with access to new network topology information and/or new device profile information for computing a network configuration and/or forward the updates (e.g., in an input data feed). As described herein, publisher module 78 may maintain one or more databases for storing network state information (e.g., in a number of location including network state information 66) and then, use the new network topology information and/or new device profile information to update the global network state information in these databases to indicate a network configuration having a new network topology and/or new device states (e.g., profiles). The example subscriber may use the one or more databases to compute the network configuration based on the new network topology and/or the new device profiles. The example subscriber or another module in the controller may program network devices with the network configuration (440).

In some examples where a SDN controller such as controller 40 is provided a subscription to a notifications service for distributing event notifications indicating updates to the global network state information. In controller 40, at least one service interface (e.g., an event listener) may be configured to receive, from the notifications service, one or more event notifications. The global network state information in these examples may be maintained remotely on one or more databases from which the notifications service is operative to distribute most recent updates to the global network state information. Controller 35 may use the event notifications to ensure that the data source is imminently updated with new network topology information and/or new device profile information and further ensure that a (new) network configuration is computed to accurately reflect each new device profile and/or new network topology. Controller 35 may generate one or more network device protocol interfaces of which each may be configured to exchange portions of the global network state information with one or more the network devices. In these examples, controller 40 may use the one or more network device protocol interfaces to implement a new network configuration that when computed, incorporates recently updated portions of the global network state information. Controller 35 may use the network device protocol interfaces to program the plurality of network devices with the new device profiles and the new network topology based on updates to device profile information and/or updates to new network topology information.

In SDN controller 40, one or more core modules may avail the up-to-date global network state information to enable (and possibly enhance) functionality provided by applications running in controller 40 or in another network device. As mentioned above, core applications use the south-hound protocols to enable PCE server 162, OpenFlow controller, and other functionality for controller 40 and other applications use the north-bound interfaces enable risers/user-apps to talk to the controller 40. These and possibly other applications rely on the core modules to have access to the above external data store; for instance, an example core module may retrieve from the external data store datasets of network topology information and then, use these datasets to perform a successful implementation of a network configuration that reflects most recent change(s) to the global network state (e.g., the network topology and/or device profiles). In some examples, such an implementation may involve, first, computing the network configuration including device profiles and a network topology based on the up-to-date global network state information (e.g., the up-to-date network topology information and/or device profile information), and, second, programming the network devices with the device profiles and the network topology of the network configuration. By operating as the single source of truth, the data source of the publisher module may enhance implementation of each network configuration iteration as the global network state changes over time.

SDN controller 40 may generate one or more operating system (e.g., kernel space) processes to use for incorporating the updated portions of the global network state information into the new network configuration comprising the new device profiles and the new network topology. In some examples, SDN controller 40 may instantiate a first thread and a second thread to each perform (parallel) processes that, in cooperation, effectuate the batch processing of the event notifications comprising the updates to device profile information and/or updates to new network topology information.

In one example, publisher module 78 may instantiate and then, execute on processing circuitry, first thread 106A operative to sleep for a configurable time period and second thread 106B operative to store one or more incoming event notifications form the notifications service when the first thread is asleep. While first thread 106A continues to wait, second thread 106B stores each event notification (e.g., received by one of the service interfaces) and (possibly) read each stored update to the global network state information. In some examples, second thread 106B be configured to store a subset of the event notifications that are received within a configurable time period such that when the configurable time period elapses, the core module computes a new network configuration incorporating a new network topology and new device profiles. In other examples, second thread 106B may store each of the event notifications, for instance, as one of a sequence of updates to the global network state information.

Second thread 106B may initialize a variable to operate as an event counter for enumerating the event notifications as well as the sequence of updates to the global network state information. Second thread 106B may monitor the service interface operating as a communication link between controller 35 and the notifications service and in response to receiving an incoming event notification, second thread 106B is configured to unlock the event counter, increment the event counter, and then, lock the event counter variable. The event counter is further operative as a trigger mechanism for first thread 106A to initiate batch processing of the event notifications that are received and stored by second thread 106B.

In some examples, first thread 106A is operative to wait until after the configurable time period to send (e.g., forward) the one or more incoming event notifications to the one or more core modules or the one or more core applications. In other examples, first thread 106A is operative to automatically read the sequence of updates to the global network state information and then, perform a technique that computes a network configuration that reflects a new global state. In one technique, first thread 106A is configured to incorporate the updates into network topology information or device profile information and then, generate new global network state information indicating (in part) a new network topology and/or new device profiles. In one example, first thread 106A may read the updates to the global network state information and identify updates to the network topology information and/or the device profile information stored in controller 35. Based on the identified updates, first thread 106A may request at least a portion of the new network topology information and/or the new device profile information stored in databases maintained by the notifications service. This request may be directed to the updates to the network topology information and/or the device profile information corresponding to the configurable time period or another time period.

In another technique, first thread 106A may coalesce (e.g., aggregate) the updates by combining sequential updates to a same device profile or a network topology and then, generating the new global network state information indicating (in part) the new network topology and/or new device profiles.

In other examples, first thread 106A is configured to perform the above techniques to a subset of the updates. First thread 106A may read new network topology information and/or new device profile information by focusing data read operations to the subset of updates. There are a number of ways to generate such a subset, for example, by removing each event notification corresponding to an update that is no longer valid for some reason (e.g., a stale update). As an example of a stale update that is to be removed, if a network device is brought online and then, brought offline during the configurable time period (e.g., sleep timer) of first thread 106A, that update is stale (e.g., due to obsolescence) and its removal further reduces the latency in the new network configuration implementation. For an iteration of a sleep timer of first thread 106A, second thread 106B may read the updates to the global network state information in the incoming event notification and generate indicia to identify the subset of updates to use for computing the network configuration. Example indicia may identify recent updates including an update that supercedes a previous update. When the sleep timer elapses, first thread 106A (e.g., in response to a signal from the sleep timer) uses the indicia to generate the subset of updates to use for computing the network configuration.

Figure 7A:
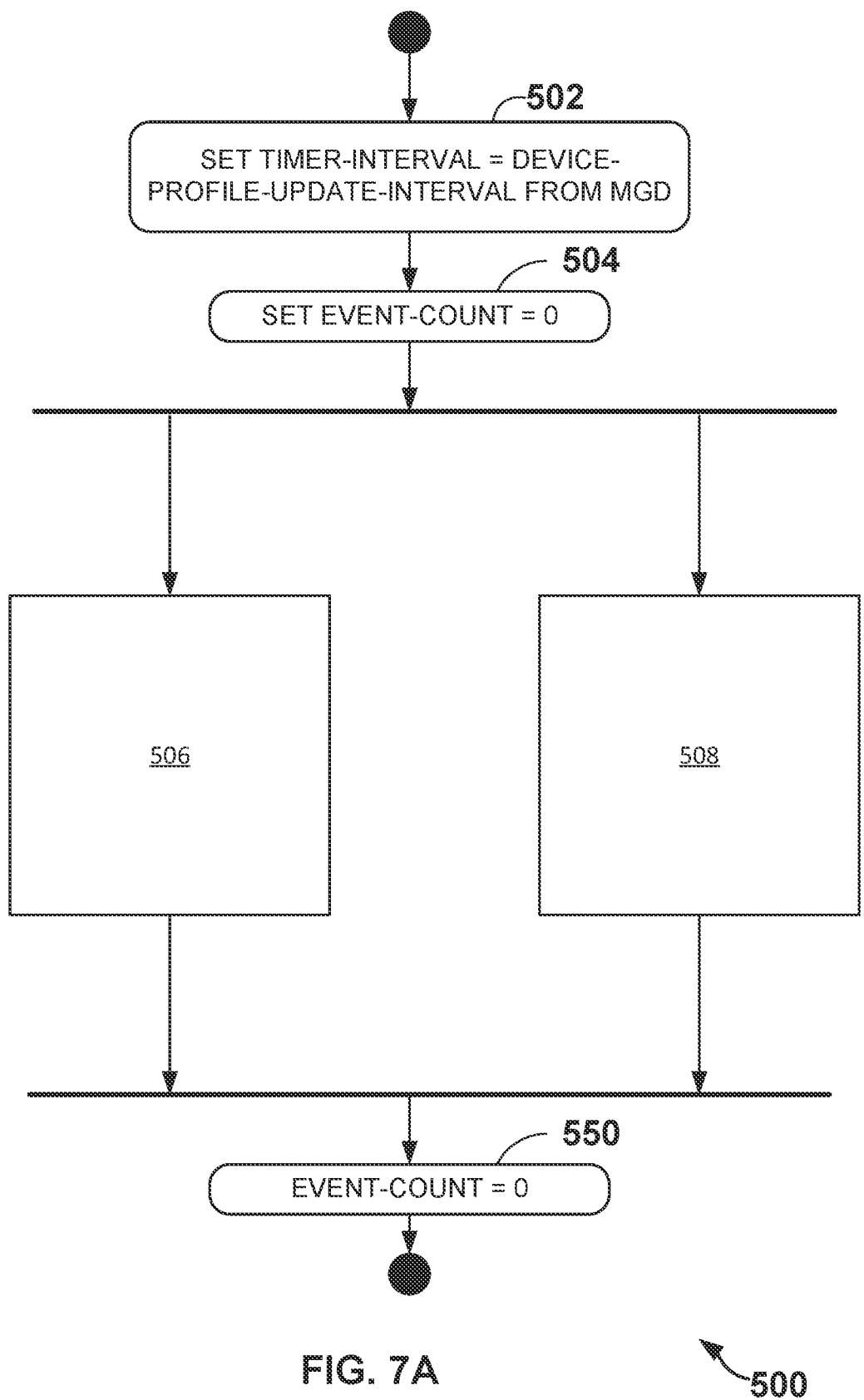
FIG. 7A is a flowchart illustrating an example process performed in a SDN controller in accordance with various aspects of the techniques described in this disclosure.
Figure 7B:
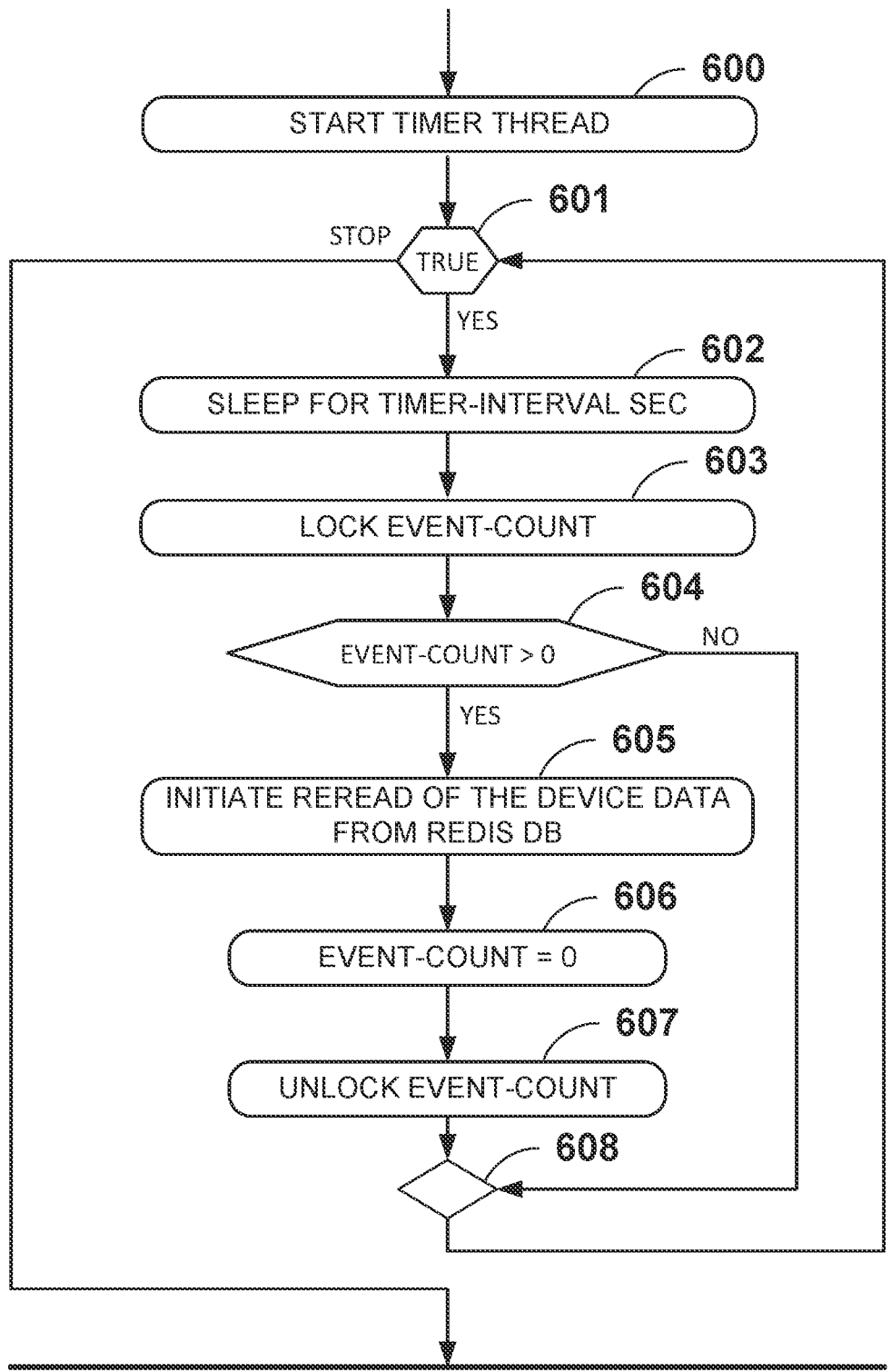
FIG. 7B and FIG. 7C are each a flowchart illustrating an example sub-process performed by a first thread and a second thread executing in the SDN controller in accordance with various aspects of the techniques described in this disclosure.
Figure 7C:
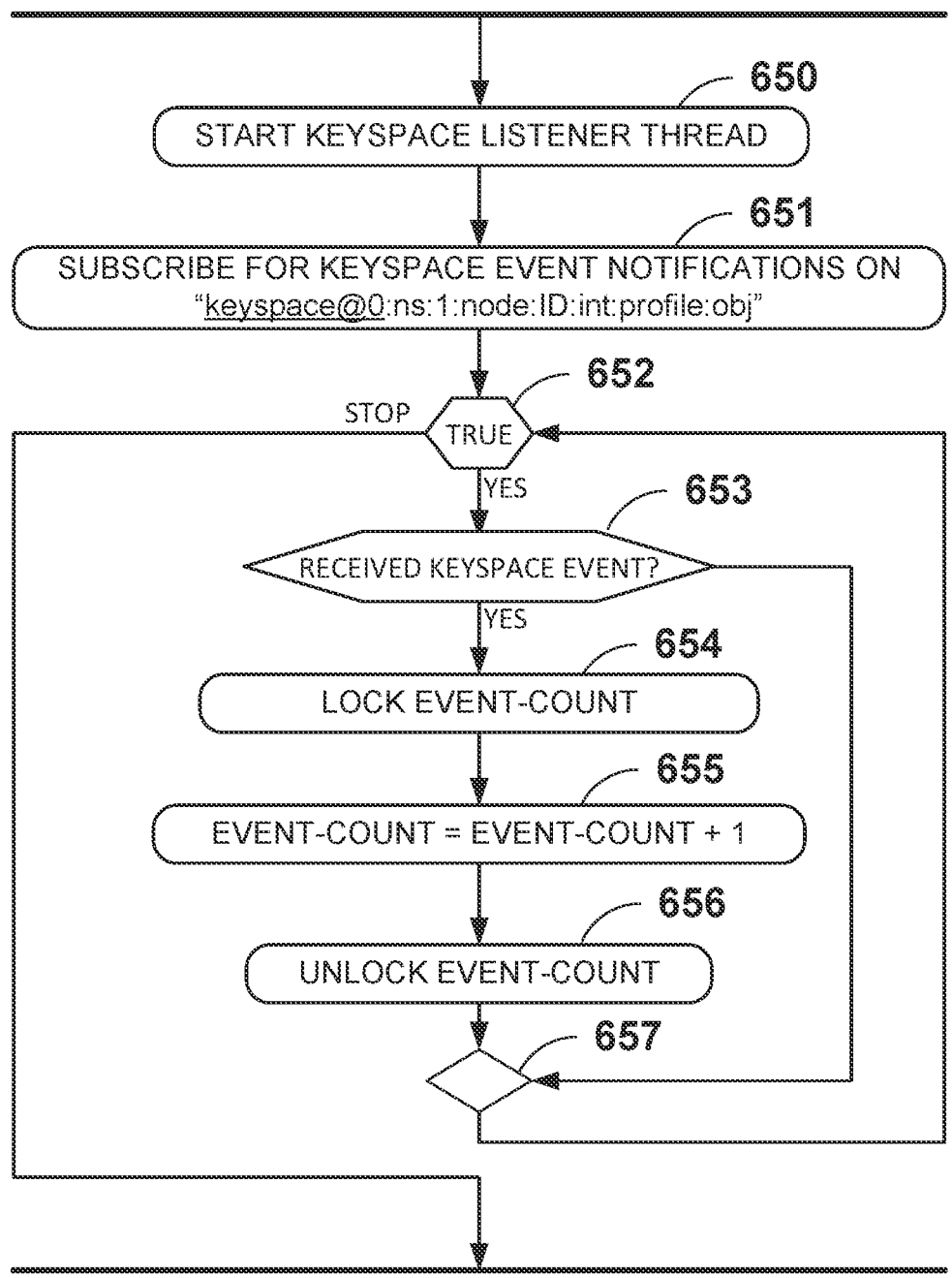

FIG. 7A is a flowchart illustrating an example process 500 performed in a SDN controller in accordance with various aspects of the techniques described in this disclosure. FIG. 7B and FIG. 7C are each a flowchart illustrating an example sub-process performed by a first thread and a second thread, respectively, executing in the SDN controller in accordance with various aspects of the techniques described in this disclosure.

The SDN controller as described herein may include a number of micro-services that use network updates to support the network functions (e.g., network services). When these microservices subscribe, via the SDN controller, to a notifications service to receive these updates, these microservices may be referred to herein as consumer clients or subscribers. An example subscriber within the controller may initiate the example process by invoking the notifications service, as a subscription service, and requesting notifications for certain events, such as event notifications comprising network topology updates.

The subscriber may set a timer-interval variable to be equal to a device-profile-update-interval (502). A management daemon (MGD) in the controller may define this interval as a particular number of seconds, e.g., based on input received via a management interface of the controller. Daemons may be executed by control unit in the SDN controller as user-level processes that run network management software. The notifications service may receive information from a topology service executing one or more daemons to execute routing protocols, for example, to communicate with peer routing devices, execute configuration commands received from an administrator, maintain and update one or more routing tables, manage subscriber flow processing, and create one or more forwarding tables for installation to forwarding components, among other functions. The subscriber micro-service receives the timer interval by a notification from the management daemon. The subscriber micro-service may initialize an event-count variable to 0 (504). Example process 500 partitions at this point in parallel tasks 506 and 508. Sub-process 506 refers to operations for reading topology and/or device profile updates when those updates are available and sub-process 408 refers to operations for determining when/if one or more (recent) event notifications from the notifications service are available for processing. Even if one or more a few notifications are available, the controller may configure example process 500 with a pre-defined sleep period or a pre-defined minimum number of notifications such that the example process 500 may continue to wait for additional notifications if the sleep period has not ended or the minimum is not satisfied. The pre-defined minimum may be modified to accommodate the subscriber. If no event notifications are received or example process 500 is scheduled to terminate, the example subscriber ends a computing service with the notification service (550)

Sub-process 506 may be performed by a first thread associated with a given subscriber micro-service, for example. Each of subscriber micro-services 340 may have an associated first thread that performs a corresponding instance of sub-process 506. Sub-process 506 may be performed by a first thread 106A of FIG. 3, in some examples. As illustrated in FIG. 7B for sub-process 506, the subscriber micro-service starts the first thread as a timer thread (600), and as illustrated in FIG. 7C for sub-process 508, the subscriber micro-service starts the second thread as a keyspace event listener thread (650) and subscribes to keyspace event notifications (651). Unless the notifications service stopped (YES branch of 601), the first thread proceeds to sleep for the number of seconds defined by timer-interval variable (602). If the notifications service stopped (STOP branch of 601), the first thread may terminate.

Sub-process 508 may be performed by a second thread associated with a given subscriber micro-service, for example Each of subscriber micro-services 340 may have an associated second thread that performs a corresponding instance of sub-process 508. Sub-process 508 may be performed by a second thread 106B of FIG. 3, in some examples. As illustrated in FIG. 7C for sub-process 508, unless the notifications service stopped (YES branch of 652), the second thread determines whether the controller received a keyspace event during the timer-interval sleep period while the first thread is asleep (653). If so, the second thread locks the event-count variable, preventing the variable from being changed by another process (654), increments event-count variable (655), and then, unlocks the event-count variable (656). If not, the subscriber microservice proceeds to determine whether to stop processing notifications (657). Unless the notifications service has truly stopped (STOP branch of 652), the second thread resumes listening for additional event notifications until the sleep period for subprocess 506 elapses.

When the first thread awakens, the first thread locks the event-count variable (603) and determines whether the event-count is greater than 0 (604). If the subscriber microservice received one or more event notifications during the sleep period, the first thread initiates a reread of device data (605), sets an event count to zero (606), and then unlocks the event count variable (607). The device data represents new network topology information and/new device profile. Unless the notifications service has truly stopped (608), the subscriber micro-service enters another sleep period while subprocess 508 counts incoming event notifications. If both subprocess 506 and subprocess 508 determine that the notifications service has stopped, the first thread and the second thread terminate example process 500.

Various examples have been described. These and other examples are within the scope of the following claims.

The invention claimed is:

1. A method performed by a software-defined network (SDN) controller that manages a network of a plurality of devices, the method comprising:
    maintaining, by processing circuitry of the SDN controller, global network state information, wherein the global network state information comprises device profile information for each of the devices in the network;
    configuring, by the processing circuitry, a notification service with a subscription for updates to the global network state information, wherein the notification service is configured to arrange the updates to the global network state information into a plurality of events;
    in response to receiving, by a second thread executed by the processing circuitry, an event notification indicating that the global network state information has been updated, incrementing, by the second thread executed by the processing circuitry, an event counter;
    determining, by a first thread executed by the processing circuitry, after expiration of a timer for a configurable time period, whether the event counter is greater than zero, and when the event counter is greater than zero after expiration of the timer:
        determining, by the first thread executed by the processing circuitry, that the global network state information includes updated device profile information for at least one of the devices in the network;
        reading, by the first thread executed by the processing circuitry, the updated device profile information from the global network state information;
        providing, by the first thread executed by the processing circuitry, the updated device profile information to at least one subscriber microservice of a plurality of subscriber microservices; and
        resetting, by the first thread executed by the processing circuitry, the event counter to zero.

2. The method of claim 1, wherein a subscriber microservice runs on a same host as the SDN controller or a different host.

3. The method of claim 1, further comprising determining, by the processing circuitry, an amount of time set for the configurable time period, wherein the amount of time is based on one or more parameters associated with providing the updated device profile information.

4. The method of claim 1, wherein the configurable time period comprises a first configurable time period, the at least one subscriber microservice comprises a first subscriber microservice, and the event counter comprises a first event counter, the method further comprising:
    in response to receiving, by a fourth thread executed by the processing circuitry, an event notification indicating that the global network state information has been updated, incrementing, by the fourth thread executed by the processing circuitry, a second event counter;
    determining, by a third thread executed by the processing circuitry, after expiration of a second timer of a second configurable time period, whether the second event counter is greater than zero, and when the second event counter is greater than zero after expiration of the second timer:

determining, by the third thread executed by the processing circuitry, that the global network state information includes updated device profile information for at least one of the devices in the network;

reading, by the third thread executed by the processing circuitry, the updated device profile information from the global network state information;

providing, by the third thread executed by the processing circuitry, the updated device profile information to at least a second subscriber microservice of the plurality of subscriber microservices; and resetting, by the third thread executed by the processing circuitry, the second event counter to zero.

5. The method of claim 4, further comprising determining, by the processing circuitry, an amount of time set for the second configurable time period, wherein the determining is based on one or more parameters associated with the configuring.

6. The method of claim 1, wherein the first thread is configured to request new network topology information and new device profile information based on the updates to global network state information.

7. The method of claim 1, wherein the second thread is configured to pause or continue listening for future event notifications when the configurable time period elapses.

8. The method of claim 1, further comprising:
sending, by the processing circuitry, the updates to global network state information; and
storing, by a publisher module executing on the processing circuitry, the updates to global network state information in one or more databases in operation on a network device of the plurality of devices.

9. The method of claim 8, wherein in response to the updates to global network state information, the notification service publishes the updates to global network state information in a hash-set keyspace within the one or more databases.

10. The method of claim 9, wherein the notification service stores one or more keyspace events comprising new network topology information or new device profile information corresponding to a node identifier-device-object identifier pair as a key-value pair.

11. The method of claim 10, further comprising establishing, by the processing circuitry, the subscription with the notification service for the event notifications to be sent to one or more modules operating the subscriber microservices for the network, wherein the subscription corresponds to a particular node identifier-device-object identifier pair in a portion of the global network state information.

12. The method of claim 11, wherein establishing, by the processing circuitry, the subscription further comprises coalescing, by the one or more modules executing on the processing circuitry, the plurality of events to determine the new network topology information or the new device profile information in the one or more databases.

13. A system that manages a network of one or more network devices, the system comprising:
memory configured to store global network state information for the network devices, wherein the global network state information comprises device profile information and network topology information corresponding to each of the network devices;
one or more processors configured to execute logic for a publisher micro-service, wherein the logic is operative to:
maintain, in a database, global network state information, wherein the global network state information comprises device profile information for each of the devices in the network;
configure a notification service with a subscription for updates to a portion of the global network state information, wherein the notification service is configured to arrange the updates to the global network state information into a plurality of events;
execute a second thread to receive an event notification indicating that the global network state information has been updated and to increment an event counter;
execute a first thread to determine, after expiration of a timer for a configurable time period, whether the event counter is greater than zero, and when the event counter is greater than zero after expiration of the timer:
execute the first thread to determine that the global network state information includes updated device profile information for at least one of the devices in the network;
execute the first thread to read the updated device profile information from the global network state information;
execute the first thread to provide the updated device profile information to at least one subscriber microservice of a plurality of subscriber microservices; and
execute the first thread to reset the event counter to zero; and
one or more core modules or one or more core applications operating as one or more of the plurality of subscriber microservices and configured to receive, via the first thread or the second thread, at least a portion of the event notifications corresponding to the subscription.

14. The system of claim 13, wherein the one or more core modules or one or more core applications are further configured to store each event notification received within a configurable time period, and when the configurable time period elapses, read new device profile information or new network topology information for each update to the global network state information.

15. The system of claim 13, wherein the configurable time period is a first configurable time period, wherein the event counter is a first event counter, and wherein the one or more processors are further configured to:
in response to receiving, by a fourth thread, an event notification indicating that the global network state information has been updated, increment, by the fourth thread, a second event counter;
execute a third thread to determine, after expiration of a timer of a second configurable time period, whether the second event counter is greater than zero, and when the second event counter is greater than zero after expiration of the timer:
execute the third thread to determine that the global network state information includes updated device profile information for at least one of the devices in the network;
execute the third thread to read the updated device profile information from the global network state information;
execute the third thread to provide the updated device profile information to at least a second subscriber microservice of the plurality of microservices; and execute the third thread to reset the second event counter to zero.

16. The system of claim 15, wherein the second thread reads a sequence of received event notifications and determines a subset of the plurality of events based on the one or more updates to the global network state information, wherein the first thread requests the new device profile information corresponding to the subset of a number of events.

17. The system of claim 13, wherein the network comprises a mobile core network communicatively coupled to subscriber devices, via a radio access network.

18. The system of claim 13, wherein the one or more core modules or the one or more core applications are configured to compute a network configuration comprising new device states to conform to profiles of the plurality of subscriber devices, generate new global network state information to implement the network configuration, and use the network device protocol interfaces to program the plurality of subscriber devices with new device profile information based on the new device profiles.

19. A non-transitory computer-readable storage medium comprising processor-executable instructions that when executed in a software-defined network (SDN) controller that manages a network of one or more network devices, causes the SDN controller to:

maintain global network state information, wherein the global network state information comprises device profile information for each of the network devices;

configure a notification service with a subscription for updates to the global network state information, wherein the notification service is configured to arrange the updates to the global network state information into a plurality of events;

execute a second thread to receive an event notification indicating that the global network state information has been updated and to increment an event counter;

execute a first thread to determine, after expiration of a timer for a configurable time period, whether the event counter is greater than zero, and when the event counter is greater than zero after expiration of the timer:

execute the first thread to determine that the global network state information includes updated device profile information for at least one of the devices in the network;

execute the first thread to read the updated device profile information from the global network state information;

execute the first thread to provide the updated device profile information to at least one subscriber microservice of a plurality of subscriber microservices; and execute the first thread to reset the event counter to zero.

* * * * *